United States Patent [19]
Seiderman

[11] Patent Number: 5,850,599
[45] Date of Patent: Dec. 15, 1998

[54] PORTABLE CELLULAR TELEPHONE WITH CREDIT CARD DEBIT SYSTEM

[75] Inventor: Abe Seiderman, Coral Gables, Fla.

[73] Assignee: ECS Enhanced Cellular Systems Manufacturing Inc., Miami, Fla.

[21] Appl. No.: 598,817

[22] Filed: Feb. 9, 1996

Related U.S. Application Data

[63] Continuation-in-part of Ser. No. 336,168, Nov. 8, 1994, Pat. No. 5,550,897, which is a continuation of Ser. No. 30,675, Mar. 11, 1993, Pat. No. 5,388,148, which is a continuation-in-part of Ser. No. 743,972, Sep. 25, 1992.

[51] Int. Cl.⁶ ............................ H04Q 7/20; H04Q 7/24
[52] U.S. Cl. .................... 455/406; 455/404; 455/408; 455/409; 379/144
[58] Field of Search ................................ 455/458, 409, 455/408, 406, 404; 379/144, 357, 91.01

[56] References Cited

U.S. PATENT DOCUMENTS

| | | | |
|---|---|---|---|
| 4,101,835 | 7/1978 | Taylor | 325/55 |
| 4,680,787 | 7/1987 | Marry | 379/63 |
| 4,718,080 | 1/1988 | Serrano | 379/59 |
| 4,776,003 | 10/1988 | Harris | 379/91 |
| 4,817,136 | 3/1989 | Rhoads | 379/357 |
| 4,829,224 | 5/1989 | Gandelman et al. | 455/90 |
| 4,845,740 | 7/1989 | Tokuyama | 379/91 |
| 4,852,146 | 7/1989 | Hathcock | 379/58 |
| 4,860,336 | 8/1989 | D'Avello | 379/63 |
| 4,903,291 | 2/1990 | Tsurufuji | 379/88 |
| 4,965,821 | 10/1990 | Bishop | 379/91 |
| 4,975,942 | 12/1990 | Zebryk | 379/144 |
| 4,977,609 | 12/1990 | McClure | 455/89 |
| 5,010,485 | 4/1991 | Bigari | 364/408 |
| 5,144,649 | 9/1992 | Zicker | 379/59 |
| 5,189,696 | 2/1993 | Yoshida | 379/355 |
| 5,208,446 | 5/1993 | Martinez | 235/380 |
| 5,212,810 | 5/1993 | Maeda | 455/58.2 |
| 5,218,367 | 6/1993 | Sheffer | 342/457 |
| 5,247,160 | 9/1993 | Zicker | 235/380 |
| 5,272,747 | 12/1993 | Meads | 379/59 |
| 5,301,223 | 4/1994 | Amadon | 379/58 |
| 5,386,106 | 1/1995 | Kumar | 235/462 |
| 5,550,897 | 8/1996 | Seideman | 379/144 |

OTHER PUBLICATIONS

Newsbytes, Jun. 24, 1991, Author Linda Rohrbough, Title "Wireless Credit Card Verification Started by Cellular Data".

PC Week, Feb. 11, 1991, by Michael R. Zimmerman, Product Announcement.

*Primary Examiner*—William Cumming
*Assistant Examiner*—Jean A. Gelin
*Attorney, Agent, or Firm*—Robert C. Kain, Jr.

[57] ABSTRACT

The portable cellular telephone credit card calling system works in conjunction with a cellular telephone, a local cellular network and an IXC in a telecommunications network. The portable cellular telephone has a handset and a transceiver unit and a credit card and electronic control interface electronically interposed between the handset and the transceiver unit. The interface unit has a credit card reader and an electronic system which initially validates the credit card. The cellular telephone also includes electronic circuitry which establishes a first telephone communications link with the network and transmits, via the transceiver unit for the phone, to the network, credit card data, a cellular telephone ID data and the telephone number input into the handset by the user. Upon receipt of at least the credit card data, a network transceiver verifies the validity of the user's credit card. After the credit card has been validated by the IXC through a verification or validation computer service, the network transceiver then completes a further telephonic communications link between the cellular telephone, operated by the user, and the telephonic device associated with the input telephone number, that is, the third party's telephone. Since the network transceiver does not complete the call to the third party prior to validation of the user's credit card, the system operates in real time. Further, in a preferred embodiment, the network transceiver provides some type of indication to the credit interface unit that the credit card has been validated. Thereafter, the user is permitted to make additional cellular telephone calls without requiring further validation of the credit card data by the network transceiver.

9 Claims, 12 Drawing Sheets

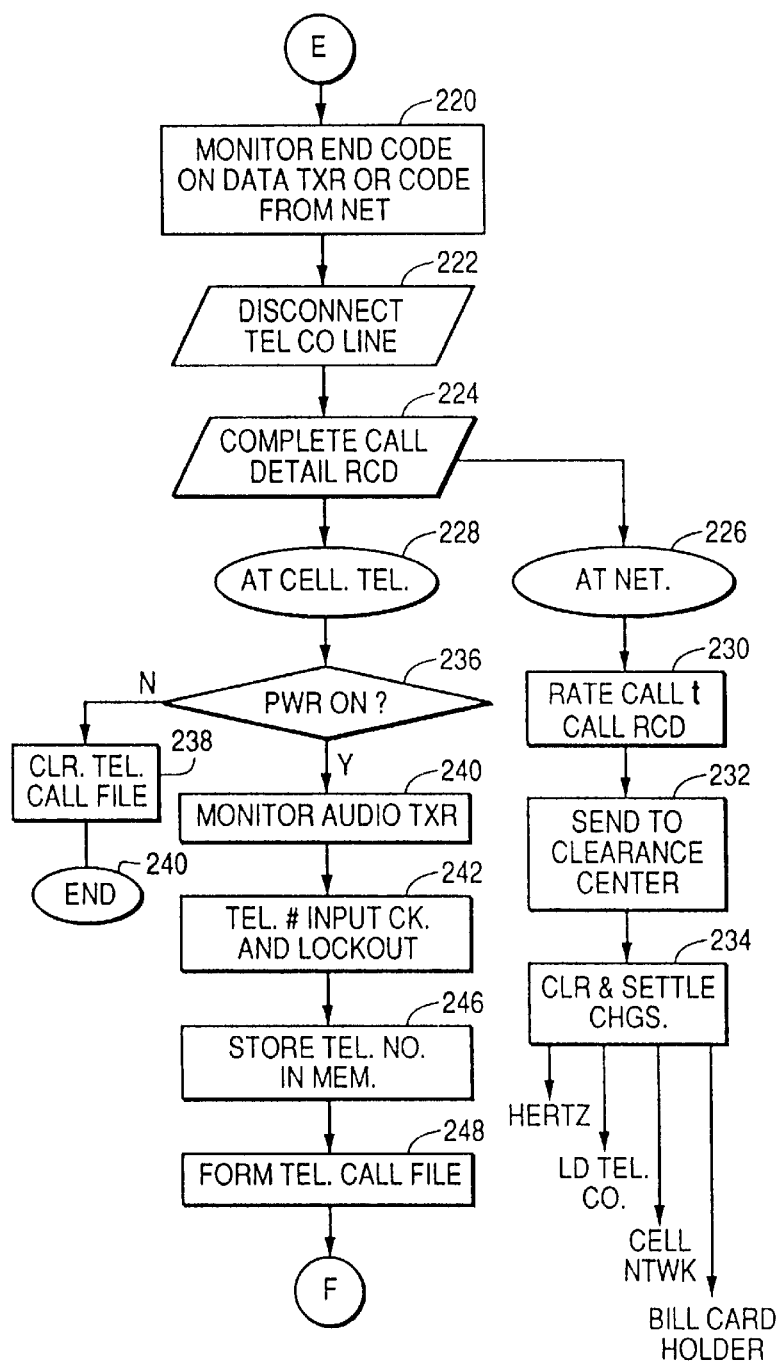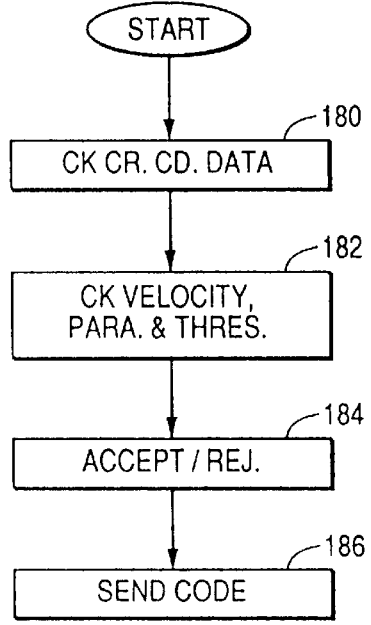

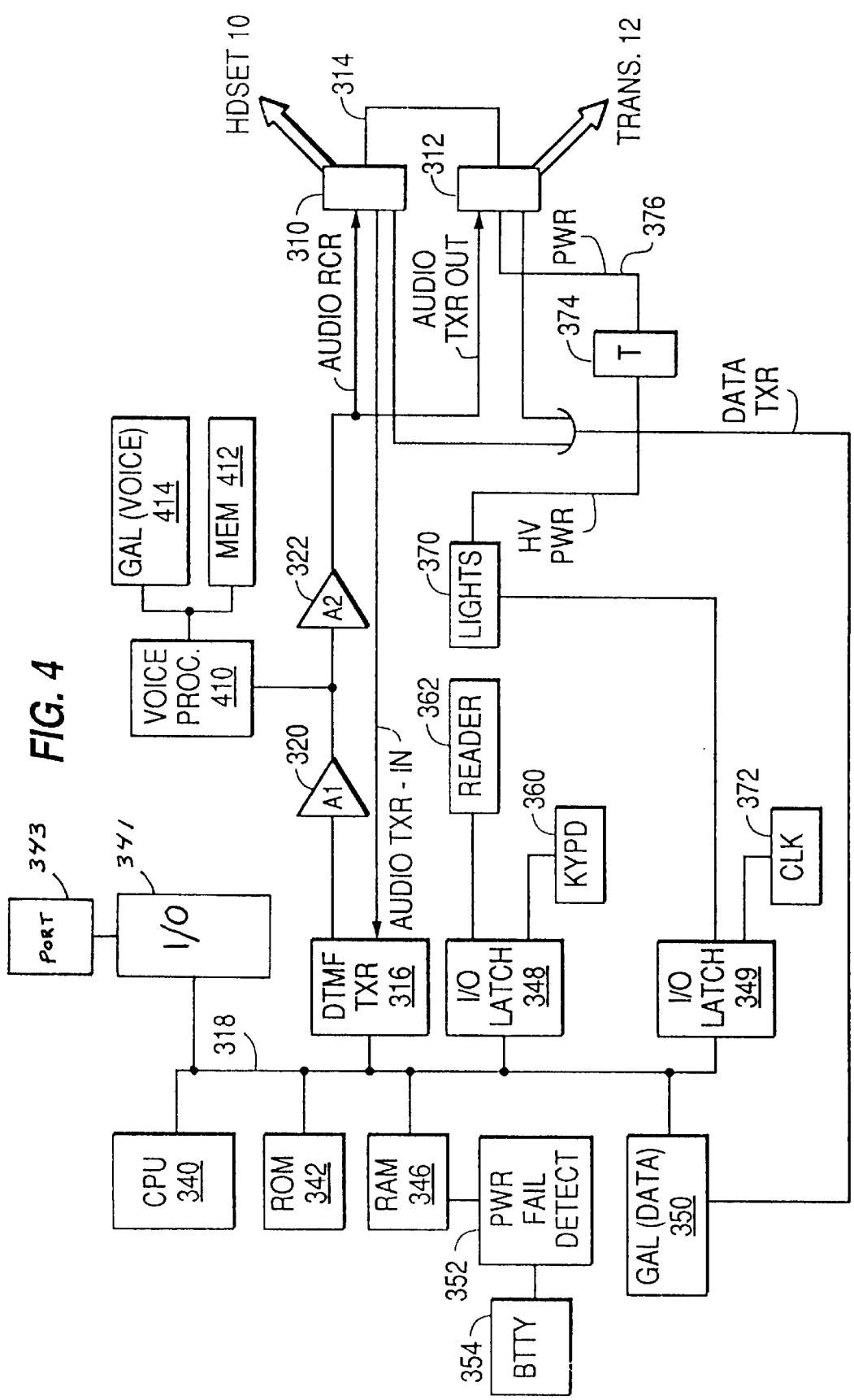

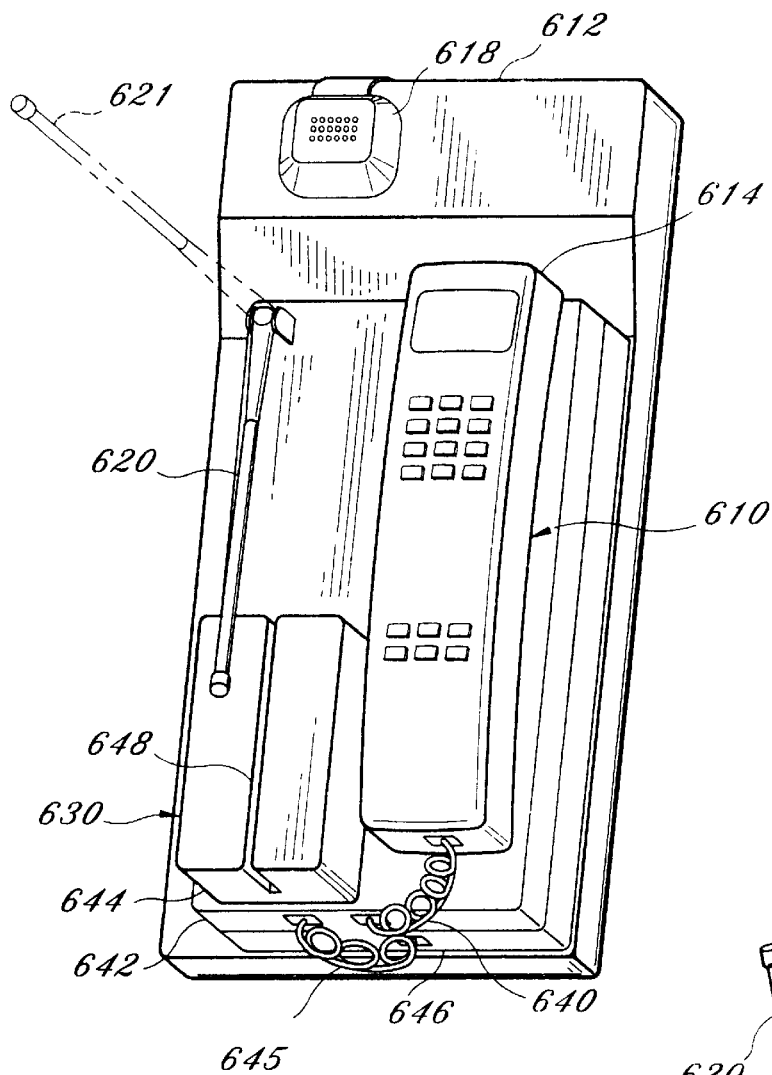
Fig. 8
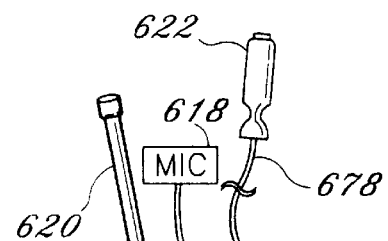
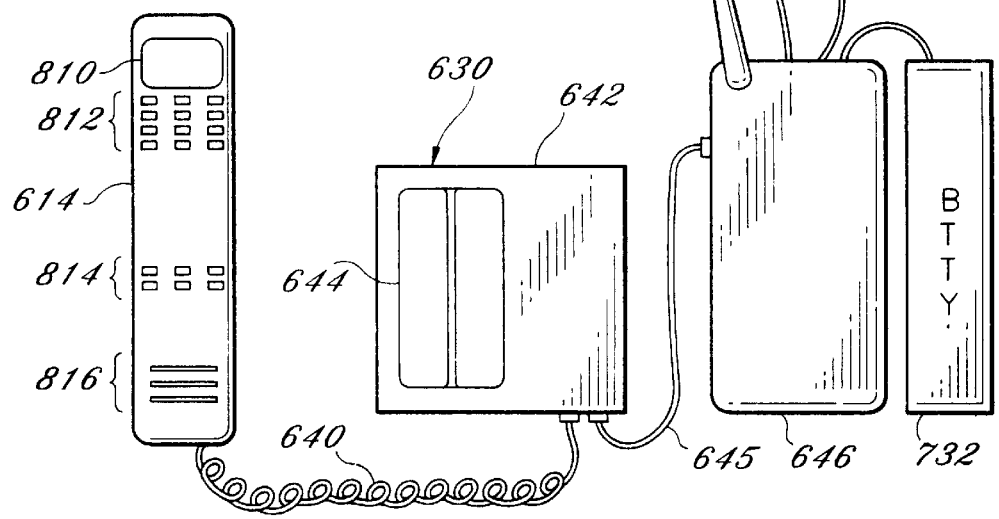
Fig. 12

PORTABLE CELLULAR TELEPHONE WITH CREDIT CARD DEBIT SYSTEM

This is a continuation-in-part of U.S. patent application Ser. No. 08/336,168 filed Nov. 8, 1994, now U.S. Pat. No. 5,550,897 which is a continuation of U.S. patent application Ser. No. 08/030,675 filed Mar. 11, 1993, now U.S. Pat. No. 5,388,148, which is a continuation-in-part of U.S. patent application Ser. No. 07/743,972 filed Sep. 25, 1992.

BACKGROUND OF THE INVENTION

The present invention relates to a portable cellular telephone calling system which verifies credit card data and charges the user's credit card upon completion of the telephone call to the third party. A method of charging credit cards for cellular telephone calls is also provided in this invention.

U.S. Pat. No. 4,860,336 to D'Avello (herein D'Avello) discloses a cellular phone coupled to a credit card reader. A processor in the phone initially verifies the credit card information, i.e., expiration date etc. The phone has lighted indicators informing the user (a) to swipe the card through the reader, (b) to "Please wait," and (c) "Sorry." A visual display also shows "Hello." The processor determines if the new card data matches the last card validated by the unit. If so, the processor permits the user to call from the cellular phone. If the card data does not match, the cellular phone dials up a registration computer. A two way communications link is established such that the registration computer validates the card, by checking the computer's data base, and then sends a validation code to the cellular phone. The registration computer, after validation or rejection of the card, disconnects the cellular telephone link with the phone. The cellular phone then permits the user to place as many phone calls as necessary. The cellular phone, before or after validation, permits 911 calls. The phone has an electronic lock-out which prohibits calls if a call timer limit is exceeded, if the car door is open or after a power-up of the phone (unless the card matches the last validated card). The phone can be programmed by the registration computer.

U.S. Pat. No. 4,965,821 to Bishop discloses a cellular phone installed in a rental car. The cellular phone has a credit card reader 234. The phone detects an open car door. The user selects a rental car and the phone issues visual indicators prompting the customer to insert his or her credit card. The phone initially validates the card, i.e., checks the expiration date. The phone also issues voice prompts to instruct the user regarding the steps to rent the car. The phone communicates with another computer via a cellular network. This computer validates the card and determines whether the car selected by the user conforms to a corporate profile stored in the computer. For example, is the user permitted to rent a luxury car, or has his or her company limited rentals to compact cars? After validation, the computer communicates with the processor in the phone and validates the transaction. The user drives the car to a booth at the exit of the lot and receives and signs a car rental agreement. This agreement is also electronically stored in the phone.

OBJECTS OF THE INVENTION

It is an object of the present invention to provide a portable cellular telephone and an associated calling system which verifies credit card information during a first portion of a telephonic communications link and then, after such verification, completes the call to a designated third party.

It is a further object of the present invention to provide a calling system whereby the user's credit card is billed for such completed calls.

It is another object of the present invention to provide a cellular phone calling system which verifies credit card data in real time.

It is a further object of the present invention to provide a calling system which, after initial verification of the credit card through a verification computer system, does not require additional credit card verification for subsequent telephone calls unless power is withdrawn from the phone unit.

It is another object of the present invention to provide a calling system whereby, once the portable cellular telephone user logs into the cellular network and his or her credit card is verified, third parties may call the user through the cellular network and such calls are billed to the user's credit card.

It is an additional object of the present invention to permit multiple credit card calls as long as the power is supplied to the cellular telephone.

SUMMARY OF THE INVENTION

This is a summarization of the functional specification of the present invention when used in an automobile as a permanently installed device. Another aspect of the invention relates to a portable credit card driven cellular telephone. The automobile installed device is discussed initially herein. Upon entering the rental car, the driver turns on the ignition. A voice prompt in the processor (located in a credit car interface unit between a cellular telephone handset and a corresponding transceiver unit) ** announces "Thank you for using Alamo Rent-a-Car." Each time the cellular telephone is powered up, this procedure occurs. The display on the interface is lit by an electroluminescence light including three flashing arrows indicating where the credit card needs to be swiped. At this stage, the customer can initiate one of four functions (represented by buttons on the interface):

A. FREE Call—911—Emergency.

B. A FREE pre-programmed 800 number customer service call to the rental car agency for assistance.

C. Auto redial which enables the user to activate the processor and redial the last destination telephone number until the connection is made, e.g., if a busy signal was encountered.

D. Provide instructions by issuing voice prompts to the user. These prompts are available in multiple languages to instruct the user regarding placement of a call.

At any time, the customer can swipe a credit card through the card reader in the interface. The processor captures and checks the credit card number and expiration date on track two of the card. The expiration date is verified by the real time clock coupled to the processor. More particularly, the processor in the interface conducts a Luhn check on the credit card data to determine if the card has been altered or forged. Further, the processor checks the expiration date of the card against a real time clock. This feature is important because if the card is not initially validated by the processor, the system rejects the card and eliminates the need for further validation of the credit card data at the telecommunications network.

If the processor determines that the expiration date or the card is not valid, it then issues a voice response advising, "Please swipe another card," and the three lighted arrows continue to flash. If the credit card is accepted by the processor, then the three arrows stop flashing and become permanently lit.

A voice prompt then advises the customer to dial a ten digit destination telephone number: 1+area code+number. Upon inputting the destination telephone number, the processor immediately dials an 800 number (a call placement number) to a telecommunications network which includes a local cellular carrier and an IXC (most likely through a long distance carrier).

The telecommunications network includes a local cellular operating carrier (providing an initial link between the cellular phone and a telecommunications network), a dedicated direct line (800 phone line, sometimes referred to herein as a call placement number) and an IXC (Inter Exchange Carrier). The IXC is a company that receives calls, validates a credit card and proceeds to bill the credit card user. After the cellular phone is connected to the IXC during a first telecommunications link, the IXC, in three seconds, establishes a separate, supplemental data telephone link between the IXC and a credit card validation computer, e.g., a computer system owned by Control Data Corp. The validation computer system reviews its data base files to determine if the credit card is good. Thereafter, the validation computer approves or rejects the card. If approved, the validation computer sends, via the supplemental or data telecommunications link, an approval code (a three digit code) authorizing the use of the card. The IXC then accepts the code and stores the code in its memory along with the credit card data. See the Call Detail Record Table in the Detailed Description. The IXC then connects the cellular telephone with the destination telephone. This secondary link is a further telecommunications link between the cellular phone, the IXC and the destination telephone.

More particularly, upon initially completing the circuit between the cellular phone and the IXC, the IXC transmits a dial tone back to the processor. The processor then forwards a stream of information to the IXC. This information includes the identification (serial number) of the processor (a terminal ID number), the credit card number and the destination telephone number. The IXC places this information into memory and holds this information in the event additional calls are made by the user. The processor advises the customer that his credit card has gone out for validation. In particular, a card accepted or "PHONE USED" flag is transmitted by the processor before the credit card data. If the card accepted flag is high (indicating a previous validation by the IXC), the processor does not send the credit card data. See the Call Protocol Table in the Detailed Description. If the card accepted flag is low, the IXC submits the credit card for validation, to a validation service (normally a computer), and waits for the authorization number. Upon receipt of authorization, the IXC processes the designation number and the call is completed.

The customer can place additional calls by dialing his or her ten digit destination telephone number at which time the processor submits the ID of the processor (the TID) and the destination telephone number to the IXC. The IXC has retained the credit card number and the ID number of the processor. The time necessary to complete the circuit for a post-validation call is approximately half the original credit card processing time. This post-validation call procedure provides a major cost savings. As long as power to the processor has not been interrupted, it is not necessary to re-swipe a credit card.

The following is the functional specification of the third party call-in system. The customer informs the third party that "You can reach me by dialing a specified 800 number and when you hear a tone dial a ten digit number 1+area code+telephone number." The third party would dial the 800 number, hear a tone and then dial a ten digit number which would then dial up the processor in the vehicle. This occurs at the IXC. Earlier, the customer in the rental car would have swiped his or her credit card and initially placed the aforementioned call to the third party. By so doing, the user has put in memory at the IXC the processor ID number and the credit card number. This enables the third party to backtrack to the customer in the rental vehicle to complete the circuit back to the rental car customer. The time and charges can be recorded on the user's credit card that is being held in memory at the IXC.

The following is a generalized description of the system when used as a portable cellular telephone. The cellular telephone credit card calling system includes at least one portable cellular telephone and a cellular telephone network. The telephone network includes a local cellular network, one or more long distance carriers, various switches, an IXC, and also a credit card verification system. The portable cellular telephone can be carried by a user. The phone is powered by a battery or by a cigarette lighter adapter in an automobile. The cellular telephone has a handset and a transceiver unit coupled together by a power and a communications bus. A credit card interface unit is interposed between the handset and the transceiver and is coupled to the bus. The interface unit has a credit card reader and an electronic system which initially validates the credit card, for example, by checking the expiration date data magnetically imprinted within the credit card. The cellular telephone also includes electronic circuitry which establishes a first telephone communications link with the telephone network and transmits, via the transceiver unit in the phone, to the network, credit card data, a cellular telephone ID data and the telephone number input into the handset by the user (sometimes referred to herein as the "input telephone number" or the "destination telephone number"). The network has a network transceiver (normally at the IXC) which receives the credit card data, the cellular telephone ID data and the input telephone number data. Upon receipt of at least the credit card data, the network transceiver verifies the validity of the user's credit card. After the credit card has been validated through a verification or validation computer service, the network transceiver then completes a further telephonic communications link between the cellular telephone, operated by the user, and the telephonic device associated with the input telephone number, that is, the third party's telephone. Since the network transceiver does not complete the call to the third party prior to validation of the user's credit card, the system operates in real time. Further, in a preferred embodiment, the network transceiver provides some type of indication to the credit interface unit that the credit card has been validated. Thereafter, the user is permitted to make additional cellular telephone calls without requiring further validation of the credit card data by the network transceiver. This significantly reduces the time of the cellular telephone call. In a working embodiment, the credit card data can be validated through the network transceiver in 30–60 seconds. After the validation at the network level, all subsequent calls by the user are completed in approximately 10–20 seconds. In order to establish this particular credit card cellular calling system, the user normally inputs the third party telephone number as a long distance telephone number. The credit card interface unit places a call to the network transceiver using a particular, predetermined call placement telephone number. In one embodiment, that predetermined call network telephone number is an 800 access number.

BRIEF DESCRIPTION OF DRAWINGS

Further objects and advantages of the present invention can be found in the detailed description of the preferred embodiment when taken in conjunction with the accompanying drawings in which:

FIG. 3 diagrammatically illustrates a credit card verification routine to positively verify credit card data at the cellular network and by the validation system;

FIG. 4 diagrammatically illustrates the major components in the credit interface unit;

FIG. 8 diagrammatically illustrates the two positions of the antenna;

FIG. 12 diagrammatically illustrates the electronic connections between the handset, the credit card and electronic control interface and the cellular phone transceiver.

DETAILED DESCRIPTION OF THE PREFERRED EMBODIMENT

The present invention relates to a cellular telephone calling system which has a credit card verification and billing component as part of the system.

Figure 1:
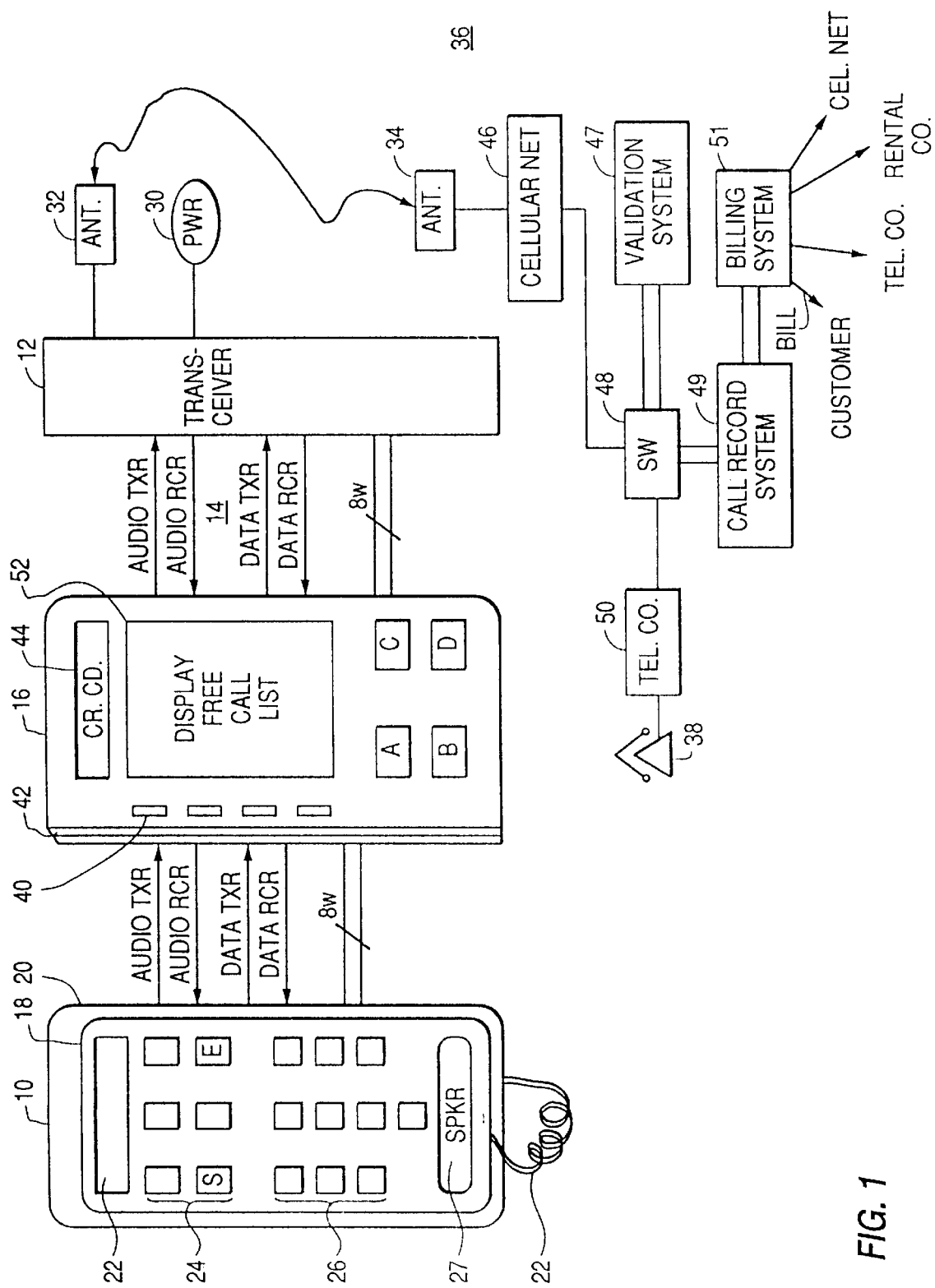
FIG. 1 diagrammatically illustrates the cellular telephone, credit card interface, cellular network and credit card billing system.

FIG. 1 diagrammatically illustrates the system which includes a cellular telephone having a handset 10 and a transceiver unit 12. In one working embodiment, a UNIDEN CP 1500 cellular telephone is utilized. The CP 1500 cellular telephone is manufactured by Uniden America Corporation. Customarily, handset 10 and transceiver unit 12 are electrically coupled together by a communications bus 14. This hardware configuration is commonly used in conjunction with mobile cellular telephones. UNIDEN has established a particular communications protocol between handset 10 and transceiver unit 12. With respect to the UNIDEN telephone, this communications cable or bus 14 is a bundle of 14 wires consisting of audio transmission (TXR) wire, audio receive (RCR) wire or cable, data TXR and data RCR, power lines as well as the following cables or wires shown in the Pass Through Table below.

Pass Through Table

Power (2x)
Ground
NX
NY
X1
X2
Hook

A credit card interface unit 16 intercepts communications signals present on four of the 14 lines, that is, Audio TXR, Audio RCR, Data TXR and Data RCR, and obtains its power from the power line but otherwise passes through all the other supplemental communications and power cables or wires 8w between handset 10 and transceiver unit 12. The details of the interception of Audio TXR, Audio RCR, Data TXR and Data RCR are discussed later. The communications protocol and wiring system is believed to be functionally substantially similar in all mobile cellular telephones. Accordingly, the present invention is not limited to UNIDEN cellular phones. Also, the present invention can be embodied into a single unit, that is, an integral unit having a credit card reader, a transceiver and a credit card interface system to control the processing of the credit card calls.

In the working embodiment, handset 10 includes a hand held unit 18 which is electrically coupled to cradle 20 via spiral flex cord 22. Hand unit 18 includes, as is customary with most cellular or mobile telephones, luminescent display device 22, numerous function keys 24, and numerous telephone TOUCH-TONE type dial keys 26. Two function keys, the Send (S) key and the End (E) key are related to the cellular telephone calling system discussed herein. All cellular telephones have these function keys. Other than the features specifically discussed herein, the cellular telephone, which includes handset 10 and transceiver unit 12, is constructed as is customary in the industry and operates in the same manner as is customary in the industry.

As discussed in detail hereinafter, signals applied to the audio lines (Audio TXR and Audio RCR) are generally tone or DTMF signals, whereas electronic signals on the data lines (Data TXR and RCR) are digitally formatted. In order to describe the present invention, signals are referred with respect to handset 10 such that DTMF signals on Audio TXR are sent from the handset and most likely from hand unit 18 through credit card interface 16 and ultimately to transceiver 12. In contrast thereto, signals representing audible responses from the cellular network or voice prompts generated by credit card interface 16, are applied to the Audio receive RCR line leading to handset 10.

It is important to note that credit card interface 16 simply interrupts certain audio and data lines extending between handset 10 and transceiver unit 12 (in addition to tapping power from the powerline designated as part of 8w in FIG. 1). In other respects, the cellular telephone (handset 10 and transceiver 12) has not been modified in any manner. As is customary, transceiver unit 12 is fed power from power source 30 which, in the preferred embodiment, is a power source from an automobile.

As background, a cellular telephone operates in the following manner. In general, the user, after powering up the cellular telephone by depressing one of the function keys 24 on handset 10, would depress a number of telephone input keys 26. These key strokes would be displayed on luminescent display 22. Other operational data may also be displayed on display 22. However, the display principally shows the input telephone number. After visually confirming the input telephone number, the user will depress the Send or S key, which is part of function keys 24. Customarily, the cellular telephone will then be connected to a local cellular system and ultimately to the destination telephone. The telephone will send certain pieces of information to transceiver unit 12. This information includes a cellular telephone ID or identification number as well as the input or destination telephone number data. This information is converted to the appropriate radio frequency by transceiver unit 12 and applied to antenna 32. Antenna 32 then transmits the radio frequency signals to antenna 34 which is part of local cellular network or carrier 46.

According to the present invention, local cellular carrier 46 is electronically coupled and is part of the telecommunications network 36 that includes switch 48, telephone company lines 50 and call record system 49. Items 48 and 49 are embodied as an IXC in the present embodiment. The telecommunications network creates a call detail record for that telephonic communications link which includes credit card data, data representing the cellular telephone ID number (in order to bill the user), and may additionally include the destination phone number or the input telephone number. Ultimately, the telecommunications network connects the user through various telephone systems represented in FIG. 1 by TEL. CO. to a destination telephonic device 38 where the third party resides. Hopefully, the third party will answer the call and a telephonic communications link will be established between the user at handset 10 and the third party at destination telephonic device 38. Upon completion of the call (represented by a disconnect signal on the line), the telecommunications network will complete the call detail record which includes, among other things, the time, day and length of the call. The IXC will periodically (i.e. daily) rate the call detail records (convert the record into telephone call charges) and a bill for these charges will be created and processed through the system.

Most importantly in the present invention, interface 16 initially verifies the credit card data, then calls a particular IXC within the telecommunications network where the credit card data is further validated through a validation or verification computer system 47. Upon verification, which takes about 20–30 seconds, the telecommunications network (i.e., the IXC) then initiates a further telephonic communications link establishing a fully functional communications link between the user at handset 10 and the third party at destination telephonic device 38. Upon completion of this call, the telecommunications network (IXC) compiles the call detail record, rates the call and periodically generates a bill for the call on the credit card for the user. For all post-validation calls by the user, the system will not validate the user's credit card (as long as power is supplied to the phone). Further details of this system are discussed below with respect to FIGS. 2A, 2B and 2C.

An important feature of the present invention is the user-friendliness of the system. The system incorporates a voice synthesizer which prompts the user to do certain acts and informs the user of each step involved in placing and verifying the call. The system flow chart begins in FIG. 2A at initialization and power up start step 110. At voice response (VS) step 112, credit card interface 16 generates DTMF electronic signals and places those signals on Audio receive (RCR) line to handset 10. These DTMF signals are synthesized voice prompts which are played through speaker 27 in hand unit 18 such that the user is informed of certain system conditions. The following Voice Response Table shows an exemplary list of available voice prompts for the preferred embodiment cellular telephone calling system.

Voice Response Table

```
0  Use your Visa, MasterCard, or American Bxpress card
1  Please contact card issuer.
2  Please swipe again now.
3  Unable to read magnetic stripe.
4  I am sorry.
5  Call cannot be completed as dialed.
```

-continued

Voice Response Table

```
6  Phone not equipped for International Calling.
7  To place your call
8  Dial area code + number for 7 digit local number.
9  Welcome to
10 Rent-a-car
11 Thank you
12 One moment please
13 Your credit card infomation is being verified
14 Please send
15 Press End
16 Hertz
17 Dollar
18 Avis
19 National
20 Avon
21 Commercial
22 Enterprise
23 Freedom
24 We are experiencing difficulties
25 Try your call later
```

As illustrated, voice response or VS step 112 informs the user as follows: "Welcome to Hertz Rent a Car. To place your call, use your Visa, MasterCard, or American Express card."

Of course, VS step 112 could refer to different rental companies, that his, voice responses 16, 17, 18, 19, 20, 21, 22, 23, or could refer to other companies programmed into credit card interface unit 16. The Voice Response Table identified above is only exemplary and shows the flexibility of the present system.

In step 114, interface unit 16 opens the Audio TXR and Data TXR lines extending from handset 10 to transceiver 12. When these lines are open, the user cannot place a call. Step 114 also initializes the circuits in the credit card interface 16.

Step 116 provides a visual prompt to the user to swipe his or her credit card. This visual prompt is a set of blinking lights one of which is light 40 on interface unit 16 in FIG. 1. The vertically aligned lights, e.g., light 40, blink sequentially and visually prompt the user to swipe his or her credit card through credit card reader slot 42 (FIG. 1). In addition, step 116 can provide a further voice response such as "Please swipe your credit card." This is identified in the step as VSn. The opening of the Audio TXR and Data TXR line between handset 10 and transceiver unit 12 prohibits the user from sending DTMF signals (from telephone number input keys 26) or data signals, particularly the Send signal (from function keys 24) to transceiver unit 12. In addition to the visual prompts (the blinking lights 40) and the audio prompts (VSn), credit card interface unit 16 has a display 44 showing what type of credit cards the unit accepts, that is, Visa, MasterCard or American Express. As an alternate embodiment, display 44 could be an electronic display unit that can be programmably altered. These features prompt the user, upon entering the rental car, to immediately insert his or her credit card into the interface, receive information regarding the type of card accepted by the system and receive information regarding the making of telephone calls. Additionally, due to the blocking of audio and digital signals from handset 10 to transceiver 12, the user cannot override the credit card interface system (explained below) without swiping or inputting his credit card data into the system.

Figure 2A:
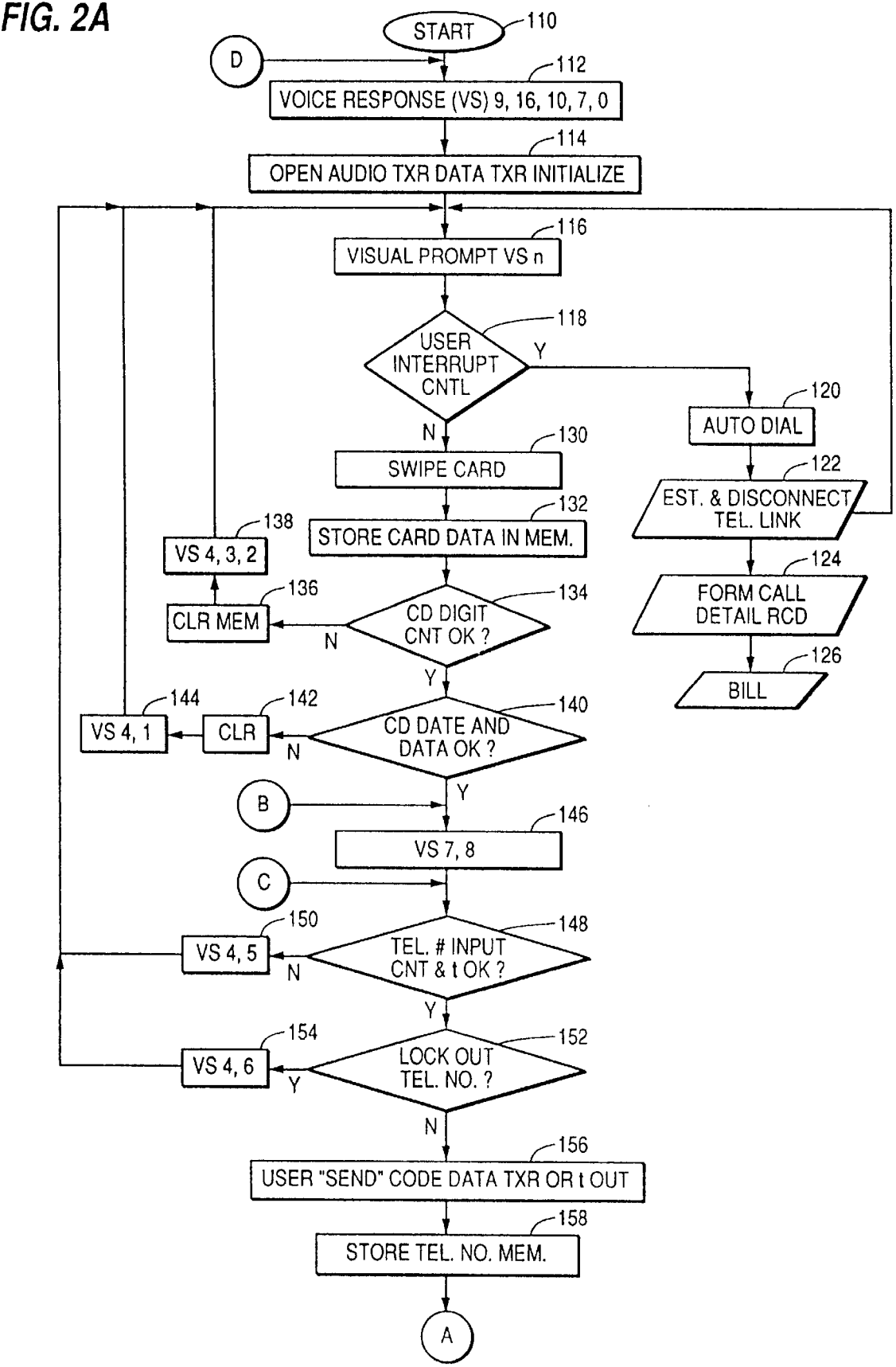
FIGS. 2A, B and C diagrammatically illustrate a flow chart of the system showing the steps for the cellular telephone credit card calling system.

Returning to the flow chart diagram of the system in FIG. 2A, decision step 118 determines whether the user has activated one of the free call interrupt controls identified as keys A–D on the face of credit card interface unit 16 (FIG. 1). The table which follows shows the function and the labels associated with the free call interrupt controls.

| | Free Call Controls | |
|---|---|---|
| Push Button Id | Display Label | Function |
| A | Redial | Redials last telephone # |
| B | Press for Instructions | Voice Prompted Instructions |
| C | Customer Service | Calls Car Rental telephone # |
| D | 911-Emergency | Calls 911 |

As shown above in the Free Call Control table, the user can redial the last telephone number input (the input telephone number data), can obtain further voice prompts regarding instructions to use the cellular telephone credit card calling system, can directly call the rental company or can place an emergency 911 call. Functions C and D permit the user to bypass the credit verification features of the system and directly call a predetermined telephone number (the car rental company or company providing the credit card cellular service) or the 911 emergency operator. This feature is encompassed within auto dial step 120 in FIG. 2A. Step 122 occurs at cellular network 46 illustrated in FIG. 1. The cellular network, upon receipt of the car rental company phone number or the 911 emergency phone number, would pass that number through to switch 48, telephone company lines 50, and ultimately to the appropriate destination telephonic device 38. Since certain portions of the credit card calling system are implemented at cellular network 46 (FIG. 1), as compared to steps implemented by the credit card interface, the network steps are shown in the system flow chart (FIGS. 2A, 2B, 2C) as parallelograms. The establish and disconnect telephone link step 122 occurs at the network. In contrast, the auto dial step, represented by a rectangle, occurs at the cellular phone. The free call to the predetermined destination (car rental company) involves the following steps:

Customer Service Routine

1. Sense user activated free call control interrupt.
2. Retrieve rental car customer service telephone no. from memory.
3. Form telephone call file with telephone no. and TID and MID (for rental car co.).
4. Place call through cellular network.
5. At cell net, log call with TID and MID (car rental).
6. Connect with rental car co.
7. Disconnect.
8. At cell net, update call record.
9. Bill rental car co. for call.

Upon activation of, for example, free call interrupt control C, credit card interface 16 retrieves the rental customer service telephone number from its memory. The interface then forms a telephone call file with either the predetermined call placement number for cellular network 46 (FIG. 1) or a predetermined free call number associated directly with the car rental company. As described in detail later, this telephone call file usually includes merchant identification number (MID), cellular telephone terminal identification number (TID), a destination telephone number (the car rental company number), and other data specifically linked to the credit card which is not used during the free calls.

In the current embodiment of the invention, the telephone call file for a free call formed by credit card interface 16 includes the call placement telephone number needed to reach a particular cellular network 46, the MID, the TID (cellular telephone ID), and the destination telephone number (rental car company). This information is transmitted via the cellular network RF link to the cellular network 46. At the network transceiver, the network compiles a call detail record as shown in step 124 in FIG. 2A. The call detail record (as explained in detail later), includes the MID, TID, destination telephone number (car rental company) and certain other time keeping information such as the time, day, and length of call. Upon completion of the telephone call as noted by the hanging up of the user (by depressing E, the End function 24 on handset 10), cellular network 46 completes the call detail record and rates the call by assigning a monetary value for the call. At cellular network step 126, a bill is produced and, in the working embodiment, sent directly to the car rental company. From the cellular telephone stand point, the system returns to visual prompt step 116. For emergency 911 calls, no bill is generated.

In addition to the free calls to the rental companies and 911 emergency calls, the user sees display 52 (FIG. 1) which reveals a further list of free calls. An exemplary Free Call List table is shown below.

| | Free Call List | |
|---|---|---|
| Speed Dial No. | Vendor | Type |
| 01 | Sands Point | Food |
| 02 | Sands Point | Golf |
| 03 | Sands Point | Tennis |
| 04 | Joe's Stone Crab | Food |
| 05 | Marriott Airport | Lodging |

Display 52 can be a physical display or an electronic display that can be altered by programming credit card interface 16. As shown in the Free Call List above, the user is given a speed dial number, a vendor and the type of goods or services provided by that vendor. Preferably up to 20 free call vendors can be listed in display 52. The Free Call List is an advertising device that (a) advertises goods and services offered by particular vendors; (b) provides additional financial revenue to the car rental company which carries the cellular credit card system; (c) provides cross-promotion of restaurants, hotels and tourist attractions; and (d) provides additional financial revenue to the cellular network implementing the credit card calling system. For example, if the user wanted to play golf, he or she would depress the "Recall" function key, depress 02 on telephone input keys 26 on handset 10 (FIG. 1), then depress function key SEND (S) in function group 24. The speed dial numbers for the vendors have been programmed into handset 10. Credit card interface unit 16 monitors the Audio transmission TXR line and detects a correspondence between the free call telephone number and the list of free call telephone numbers stored in its memory. Upon a positive comparison between the free call list and the memory of interface unit 16, interface unit 16 then initiates the telephone call. In the working embodiment, this call uses the call placement telephone number which dials into a particular cellular network. This call placement number in the working embodiment is an 800 long distance access telephone number. Upon clearance by the cellular network and the formation of a call detail record (the network recognizes free calls by a comparison routine), the cellular network 46 then completes the call to the destination in the free call list. The cellular network 46 further compiles a list of all free calls made by the user since each call detail record includes a cellular telephone ID (TID) and then can either bill the vendor on the free call list, the car rental company, or absorb the expenses for the cellular telephone call as a cost of doing business and obtain advertising revenue from the vendors on the free call list. Since most rental car customers rent cars in unfamiliar jurisdictions, these customers are provided with an easy way to use local goods and services. The flexibility provided by the present invention (the free call vendor list can be changed electronically by programming interface 16 via handset 10) enhances the overall commercial acceptance of the device. Further, car rental companies may offset some of the cost of the credit card calling system by collecting the advertising revenues from the vendors shown on the free call list.

Rather than program the speed dial memory in the handset 10 such that free call numbers are retrieved therefrom, the credit card interface may have its own speed dial memory. In this embodiment, the user would, for example, depress a "Free Call Activation" key on interface 16 (similar to interrupt controls A–D), depress the speed dial code on handset key pad 26, depress Send function key (pad 24) and the interface unit would then place the call to the vendor over the cellular network. In a further embodiment, interface unit 16 could include speed dial function keys.

Assuming that the user has not activated the free call interrupt controls or the free call list, the following occurs.

In the most ordinary case, the user would not activate the free call interrupt control or place a call to a vendor on the free call list. In such situations, the program follows the NO branch from decision step 118 to the swipe credit card step 130. To visually prompt the user, step 116 continues to flash sequential lights 40 in an effort to motivate the user to insert his or her credit card into the interface by sliding the magnetic strip of the credit card through reader track 42 (FIG. 1). Upon inputting the credit card data into interface 16, step 132 stores the credit card data in the memory of the interface. Decision step 134 is a card digit and count check. In other words, the interface initially verifies that the correct sequence of credit card data have been input and stored into its memory. In addition, decision step 134 determines whether the card data has been received within a certain frequency parameters (that is time parameters). If not, the NO branch is taken from step 134 and in step 136 the memory is cleared. Step 138 is a voice response VS step which informs the user "I am sorry. Unable to read magnetic stripe. Please swipe again now". The local program in the credit card interface unit 16 then returns to the visual prompt step 116.

If the YES branch is taken from decision step 134, in decision step 140, the interface unit 16 checks the credit card expiration date and data. For example, a Visa card may have a certain data format which differs from MasterCard, American Express etc. These formats can be confirmed against a memory check in interface unit 16. Further, the magnetic data stored on each credit card includes an expiration date. The interface includes a clock and a calendar system such that if the expiration date of the credit card exceeds the current date stored within interface unit 16, the NO branch is taken and memory is cleared in step 142. Again, a voice response step 144 informs the user that the card cannot be used by stating "I am sorry. Please contact card issuer." These voice responses are shown in the Voice Response Table above. Of course, additional voice responses could be provided to the user including a response that the credit card has expired and a request that the user insert another credit card into the system. From step 144, the program in the credit card interface 16 returns to the visual prompt step 116.

In one embodiment, the credit card interface processor is designed and engineering to read the entire Track II from Visa and MasterCard credit cards and pass it in an unaltered state to either the user's authorization database or it's agent. This data track on the card includes the CVC (Visa) and CVV (MasterCard) codes for consumer fraud, the expiration date, primary account number, service code field and pin verification fields. The interface processor maintains an internal clock that validates the expiration data information, and performs a Luhn or number sanity check to insure there are sufficient numbers in the account number field and that the proper algorithm has been employed. If it becomes necessary to read and analyze data on Track I or both Tracks I and II, the processor can be re-engineered to comply with the regulations.

In an ordinary situation, the credit card data would be initially validated by the credit card interface unit 16. This initial validation is a confirmation of the accuracy of receipt of the electronic data from the card, a correspondence or data format for a particular card, the time frequency for the receipt of the information, and the confirmation that the card has not expired. Voice response step 146 informs the user "To place your call, please dial the area code and the seven digit telephone number." The user inputs a long distance telephone number even though he or she wishes to make a local phone call. The reasons for the input of a long distance phone number is discussed hereinafter. Decision step 148 determines whether the telephone number input into the credit card interface 16 is correctly input by checking the time receipt of that information (t) and determining whether the user has in fact input the telephone number as a long distance phone call. If the NO branch is taken from step 148, voice response step 150 informs the user that the call cannot be completed as dialed. See Voice Response Table items 4 and 5. If the YES branch is taken form decision step 148, decision step 152 determines whether the input telephone number data corresponds to a lock out telephone code. The following Lock Out Call Table shows various lock out telephone codes.

Lock Out Call Table 011 (International)

10 (International)

976 (Bill caller)

1-976 (Bill caller)

1-900 (Bill caller)

For example, the present system does not allow the user to dial an international call or to dial a telephone call which bills the caller. The interface unit 16 can be programmed by activating telephone key pad 26 in handset 10 thereby changing the lock out call table to add new lock out call or delete certain lock out call. Interface 16 can be programmed by inputting a special key code into the handset. The interface monitors the Audio TXR line and, upon receipt of the DTMF signals representing the key code, permits the programmer to change the lock out codes, free call list call placement number, and other critical but variable data in the system. The phone controller or interface permits programming regarding the following features: restricted phone number (such as 976's, 900, etc can be accepted or rejected by the unit); IXC or call placement phone numbers; and the order in which the stream of characters are sent out to the telecommunications network, particularly the IXC.

For instance, in a second working embodiment, the credit card number followed by the destination number is sent out in a single stream of characters. This communications protocol is different than the protocol generally described herein in which the stream of characters is partitioned into three segments: phone identification number, credit card information, and destination phone number. Furthermore, in the second embodiment, the user is required to slide his or her credit card through the cellular phone card reader prior to every call made. These changes were made by modifying the program installed in the credit card interface or phone processor. These changes were easily implemented because of the flexibility obtained my making the unit fully programmable.

If the YES branch is taken from decision step 152, the user is informed that his or her call cannot be completed in voice response 154. See Voice Response Table items 4 and 6. If the NO branch is taken from decision step 152, the user in step 156 strikes the Send (S) key in function key pad 24 of handset 10. This Send key electronic code is placed on the Data TXR line by handset 10. Alternatively, interface 16 could monitor Audio TXR and determine by a time out routine that the user wants to place a call after entering the long distance destination number into the handset. In this situation, it is not necessary to depress the Send key. As is customary in the industry, the input telephone number has been placed on the Audio TXR line by handset 10. Credit card interface 16 also provides an echo of the input telephone number which is applied, as is customary in the industry, on Audio receive RCR line. In step 158, the input telephone number data is stored in the memory of credit card interface 16.

Figure 2B:
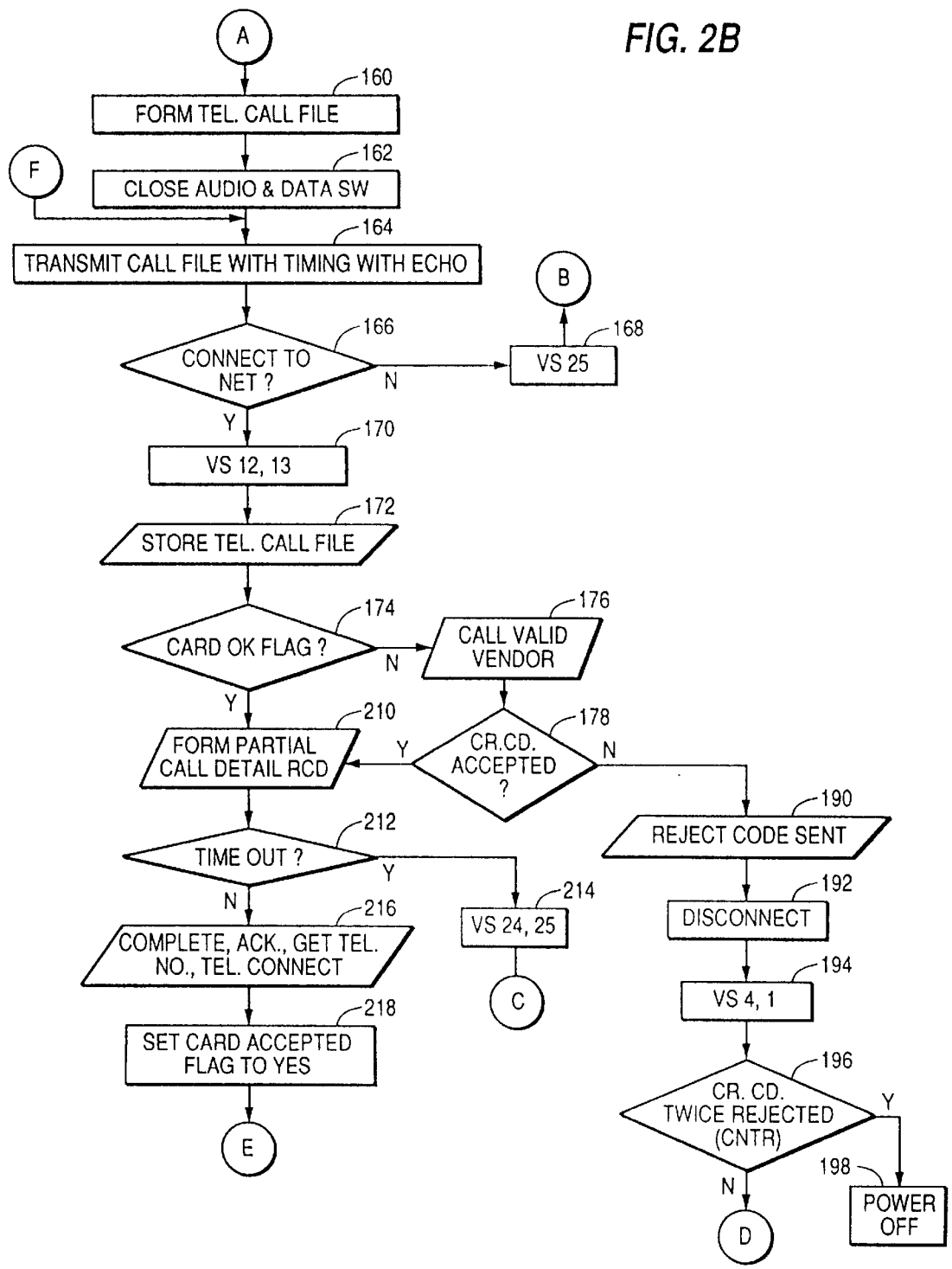
Figure 5A:
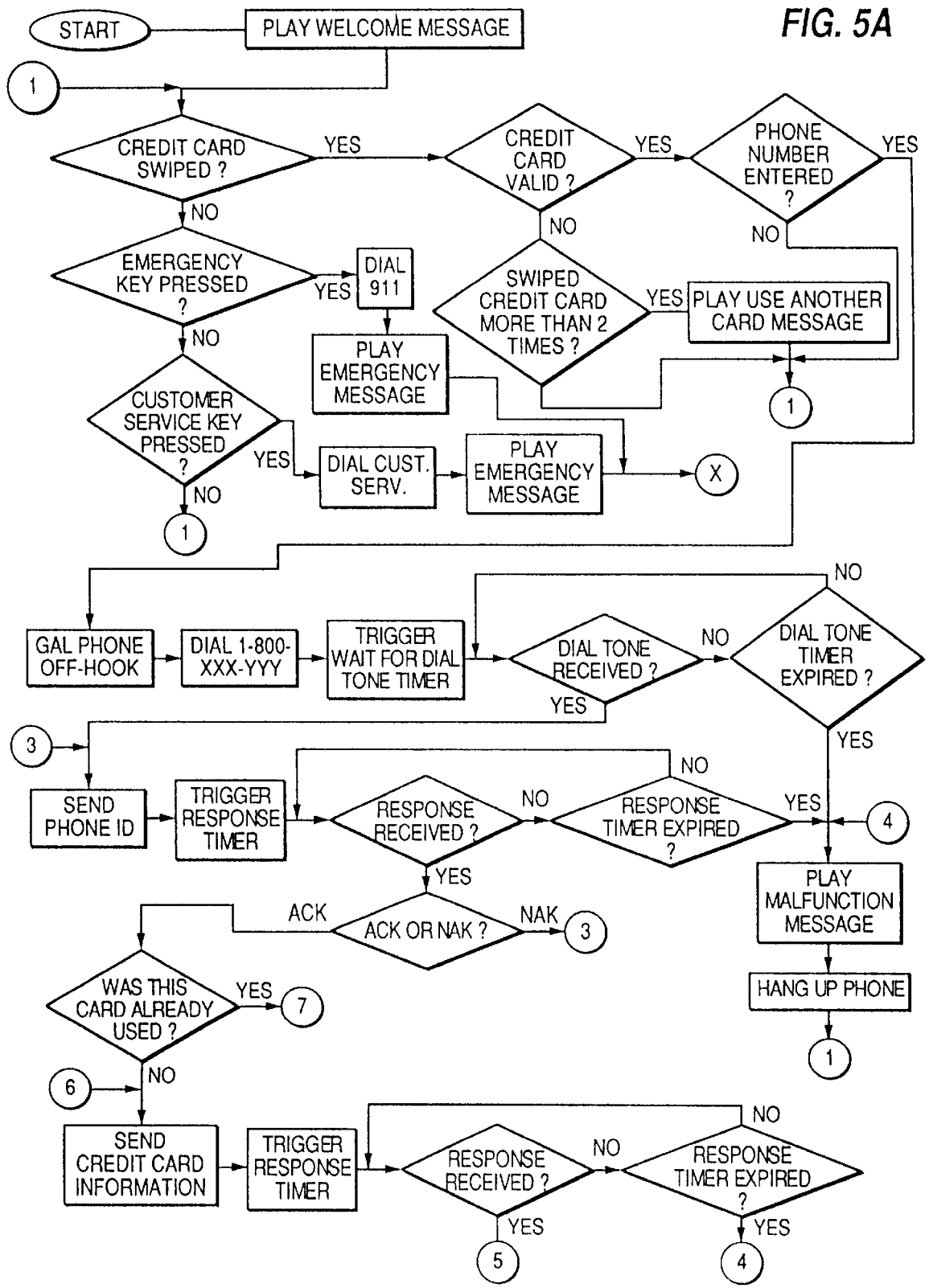
FIGS. 5A and 5B illustrate a detailed flow chart of the interface program.
Figure 5B:
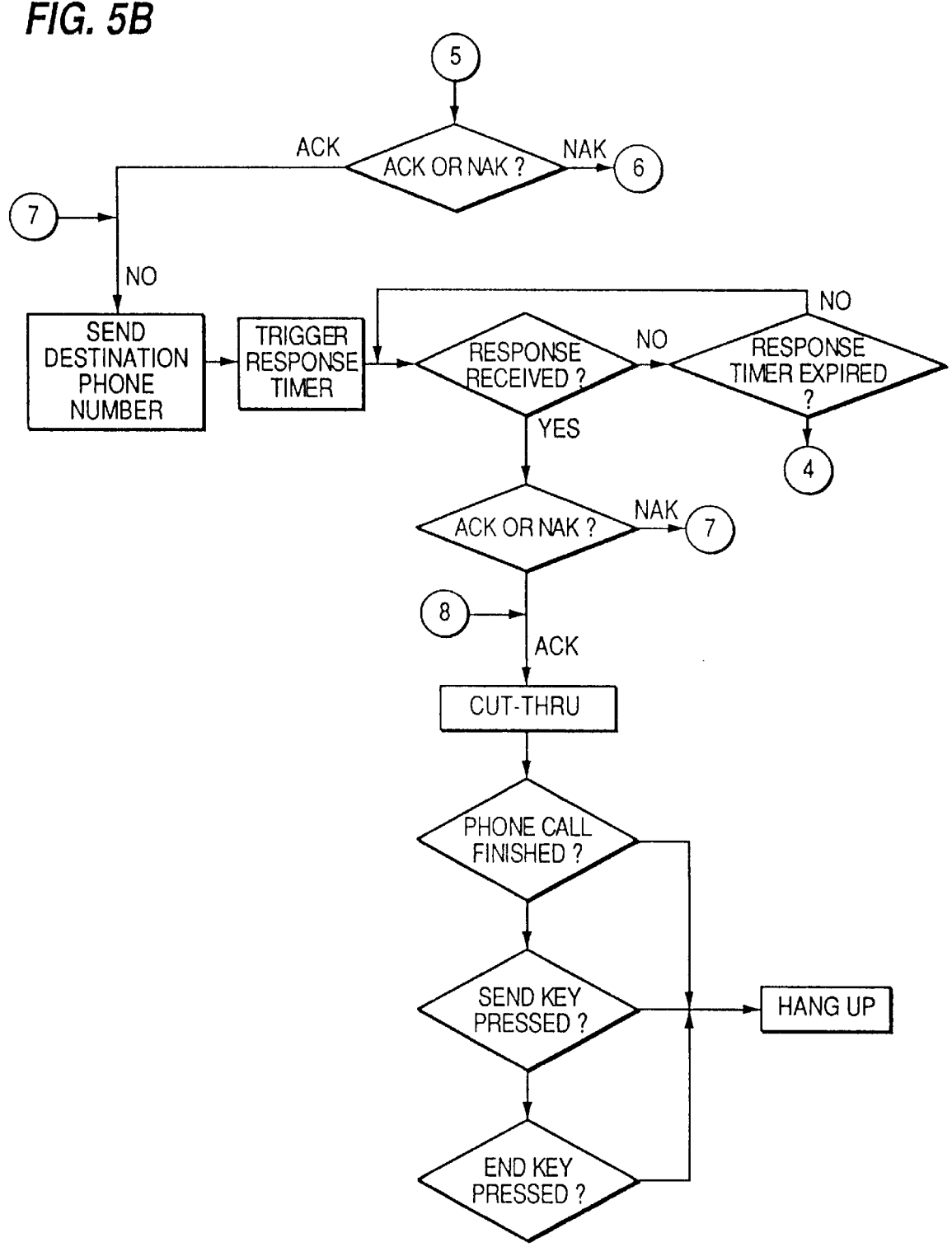

The system flow charts shown in FIGS. 2A, 2B, 2C are linked together by jump point A shown in FIGS. 2A and 2B and, particularly, jump point E shown in FIGS. 2B and 2C. Other jump points return to intermediate steps and are identified in the figures as jump points B, C, D, and F.

In FIG. 2B, interface unit 16 forms a telephone call file in step 160. The following table shows the telephone call file in a working embodiment.

Telephone Call File

800 LD Access #(AT&T; MCI; Cellular World)
MID (Merchant Id#)
TID (Terminal Id#)
Destination Tel #
CR CD Data
Card Accepted Flag (YES/NO)

In the working embodiment, the telephone call file uses a predetermined call placement number which is an 800 long distance access number through a cellular telephone network to an IXC in a telecommunications network which is identified in the industry as Cellular World. Since certain components of the cellular telephone credit card system include processing data at the telecommunications network (particularly the billing of the user's credit card), in the working embodiment, all calls in the system are placed to one predetermined call placement telephone number. However, if several cellular networks participated in the system, different call placement numbers would be used. As discussed later, all calls placed to a designated telephone by the user are, in fact, placed with the call placement telephone number unique to a certain IXC in a telecommunications network. The telephone call file formed by interface 16 also includes cellular telephone ID data which is similar to or equivalent to the terminal ID (TID) customarily associated with credit card purchases in the consumer transaction industry. The merchant ID (MID) may designate the car rental company, or other entities which will be compensated by the bank for the credit card call. The cellular telephone ID number is similar or identical to the terminal ID number (TID). In the credit card transaction industry, the TID is normally associated with a particular terminal which verifies credit card data.

In the working embodiment, the IXC electronically submits the credit card transaction data with the TID, MID, credit card number and validation approval code to the user's bank or credit card issuer. The credit card issuer pays the network which in turn pays various entities, such as the car rental company, the local cellular phone network, etc. Since the call placement number is an 800 long distance access number, the calling system works throughout the U.S. Since long distance access procedures normally require the user to input an area code to call a particular destination, the present system utilizes these features and requires the user to dial an area code even though he or she wants to make a local call.

The destination telephone number is the equivalent of the input telephone number data input by the user using the telephone key pad 26 in handset 10 of FIG. 1. The credit card data stored in the telephone call file represents the data obtained from the credit card by the credit card reader and interface 16. The credit card accepted flag is a positive or negative statement (YES/NO) which indicates whether the credit card has been validated through the validation system described hereinafter and associated with the telecommunications network. Initially, the credit card accepted flag is set to NO as part of the initialization step 114 in FIG. 2A.

Step 162 closes certain audio and digital communications paths between handset 10 and transceiver 12. Step 164 transmits the call file from interface 16 via transceiver 12 to telecommunications network. As is customary in the industry, the transmission of information is echoed by transceiver 12 back to display 22 in handset 10. The Audio RCR and Data RCR signal paths are closed to produce this echo. Accordingly, the user is informed that (a) the cellular phone has dialed the particular call placement telephone number unique to a certain IXC in a telecommunications network, (b) the MID and TID have been sent, and (c) the credit card data has been sent to the network. Decision step 166 determines whether the first telephonic communications link has been established between the cellular telephone (consisting of handset 10, transceiver 12, interface 16) and the IXC in telecommunications network. If the NO branch is taken from decision step 166, voice response step 168 indicates to the user that he or she must try the call later. The local program in the interface unit then jumps, via jump step B, to the voice response step 146 which again informs the user to place the call through the system using a long distance phone number. The destination telephone number is removed from the call file memory.

If the YES branch is taken from decision step 166, voice response step 170 informs the user that his/her credit card information is being verified by the network. As stated earlier, the parallelogram about step 172 indicates that the IXC in telecommunications network executes the step. At that network, certain information is stored for processing. Network decision step 174 determines whether the card accepted flag is set YES or NO. Network decision steps are shown as having a double line on the right side of the decision diamond. Local decisions made by the cellular phone are shown as single line diamonds.

In the working embodiment, a certain communications protocol has been established between the cellular telephone and the cellular network. The Call Protocol Table shows that communications protocol.

Call Protocol Table

1. Dial predetermined cell net number.
2. Handshake (acknowledge, no ack., retry).

3. Send cell. phone id. (TID).

4. Handshake

5. Send cr. cd. data and card accept flag

6. Handshake (ack. only if card validated or if flag YES)

7. Send destin. tel. #

8. Handshake

9. Establish comm. link with destin. tel.

As is shown in the above table, the cellular telephone calls the telecommunications network using the determined call placement telephone number. The network provides a handshake which is basically an acknowledgment (Ack.) that the first telecommunications link has been established between the network and the cellular telephone. If the network has not accepted the placement number, the network sends a NO acknowledgment signal and the cellular phone retransmits the information at least once. In step 3 of the protocol, the cellular telephone sends the cellular telephone ID to the cellular network. This ID at least includes the TID and may further include the MID. The network then provides a handshake (an acknowledgment or a NO acknowledgement) and then, if acknowledged, the phone sends the credit card data and the card accept flag. The card accept flag, as stated above, is either YES that the card has been previously accepted or NO the card has not been previously accepted. The card accepted flag is sometimes referred to herein as the phone used flag. The network then acknowledges receipt of that data if the card accept flag is set to YES.

If the card accept flag is set to NO, the IXC in the telecommunications 47 network, before sending the acknowledgment (step 6), calls a validation vendor system in step 176. The NO branch is taken from network decision step 174. After calling the validation vendor (step 176), which is normally a computerized credit card validation service, network decision step 178 determines whether the credit card has been accepted by the validation vendor's computer. In other words, in the credit card transaction industry, there are completely computerized credit card validation services that validate credit cards in real time. The telecommunications network described herein electronically calls one of those credit card validation services and obtains verification of the validity of the credit card before completing the second portion of the telephonic communications link to the third party. This is a supplemental data telecommunications link.

FIG. 3 shows a brief flow chart of this type of validation. In step 180, the basic credit card data is checked by the validation computer system. For example, is the credit card a valid Visa credit card with the correct numbers? Has the credit card been reported stolen? Step 182 determines the velocity of use (the number of times per predetermined period that the credit card user has used the credit card, e.g., more than 30 times per day), whether the credit card use falls within certain parameters and exceeds certain thresholds. For example, a validation service may determine that, once credit has exceed a $1,000.00 spending parameter through multiple transactions over a one day period, the credit card user will be called by the credit card company. In step 184, the credit card validation service either accepts or rejects the credit card. In step 186, that acceptance or rejection data is sent back to the IXC in telecommunications network (FIG. 1). This may be an approval code.

The interface processor is configured to interface with specific authorization and validation vendors to receive an "OK TO USE" approval code prior to completing the first call between the user and the destination phone. Initially the credit card will be employed as the payment option which requires an authorization vendor (ultimately Ceridan TeleMoney) to provide the proper fraud control mechanisms for the system and to insure that a timely response to the IXC's validation request is received by the processor (in the form of an acknowledgment). As the calling system expands, other third party validation communication networks will be employed to secure the proper validation to approve the credit card track environments for other payment options.

Network decision step 178, upon receiving the rejection code from the credit card validation company, follows the NO branch and enters network step 190. A reject code is noted and this data is linked with the credit card data in call detail record file formed at the network. The network then refuses to send the acknowledgment to the cellular phone, noted as step 5 in the Call Protocol Table, and after a certain time out period (for example, 30 seconds), interface unit 16 disconnects the first telephonic communications link between it and the network in local step 192. Thereafter, interface unit 16 executes voice response step 194 which informs the user that he or she must contact the credit card issuer. As part of the initial validation at interface unit 16, the interface unit may also execute decision step 196 which determines whether the credit card number input by the user has been twice rejected by the IXC in telecommunications network. If it has, the YES branch is taken and the system powers down in step 198. Steps 196 and 198 are optional. If the NO branch is taken, the local program in interface unit 16 passes to jump point D which precedes voice response step 112 (the initial voice response step) in FIG. 2A.

Again assuming that the credit card has been accepted by the validation service and by the network (network decision step 178), the YES branch is taken and the network executes step 210, wherein the network forms a partial call detail record. Returning to network decision step 174, if the card accepted flag code is YES or high (from the phone), the YES branch from that decision step also leads to network step 210 forming the partial call detail record file. The Call Detail Record Table which follows shows the information present in the call detail record.

Call Detail Record Table

MID

TID

Destin. tel. #

CR CD Data

Authorization Code

Time, Day

Length

Cost

In interface 16, local decision step 212 determines whether an excessive amount of time has passed (a time out function) since the cellular phone sent the credit card data (step 5 in the Call Protocol Table) to the network. If so, the YES branch is taken and voice response step 214 informs the user that the system is experiencing difficulties and requests the user to try the call later. The local program in interface 16 then jumps to jump point C in FIG. 2A which precedes local decision step 148. If the time has not run out in local decision step 212, the IXC in telecommunications network in network step 216 completes the first portion of the call, sends an acknowledgment or handshake (step 6-Call Protocol Table) and obtains the destination telephone number (the input telephone number data) from credit card interface unit 16 via transceiver 12 (step 7-Call Protocol Table). Since the credit card has been invalidated in accordance with standard credit card validation procedures (through a validation computer system), the call detail record is updated to log in the authorization code obtained from the validation system. In addition, the time and day of the call is noted in the call detail record, as well as the start time of the call. At the local level in interface unit 16, step 218 sets the card accepted flag to YES. This occurs based upon the acknowledgment from the network in step 6 in the Call Protocol Table. In other words, the IXC in the telecommunications network would not acknowledge the credit card and request the sending of the destination telephone number unless the credit card has been independently validated through the validation computer system. After local step 218, the flow chart goes to jump step E in FIG. 2C. Local step 220 monitors Data TXR line and the user such that when the user presses the End E function key (function key pad 24) on handset 10, interface 16 notes the end of the call. An electronic signal is placed on Data TXR commensurate with the End call signal made by the user's depression of key E. Network step 222 then disconnects the telephone call. Optionally, the IXC in the telecommunications network senses a disconnect tone on the line. Thereafter, the IXC will send a disconnect signal to the interface. The interface 16 will decode the signal and disconnect the cellular link with cellular network 46 without depression of the End Key. This reduces cellular network time.

In network step 224, the telecommunications network completes the call detail record. The call detail record includes the total length of the call. The IXC in the network rates this call and includes a dollar amount to be charged to the user's credit card. After network step 224, the system flow chart separates such that the path below circle 226 occurs at the cellular network, whereas the path below circle 228 occurs at the local cellular telephone.

At the network (circle 226), the call is rated in step 230. This rating can occur in the call record system 49 shown in FIG. 1. In FIG. 1, the communication between the telecommunications network and the credit card validation system 47 is shown by double lines extending from switch 48 to validation system 47. Network step 232 sends this credit card charge to a credit card clearance center. These clearance centers (shown by double lines leading to billing system 51 in FIG. 1) are well known in the credit card transaction industry and are available to electronically process this financial information for many types of credit card vendors. The electronic sending of the credit charge information to the clearance center is represented in FIG. 1 by the double line extending between call record system 49 and billing system 51. Returning to FIG. 2C, network step 234 clears the credit card charges and settles those charges by billing the user's credit card, and transmitting funds to the appropriate entity.

Particularly, after the call is completed, the IXC in the telecommunications network tabulates or rates the call. If additional calls are made by the user, these call are fed through the IXC, logged with the user's credit card and rated. At the end of the day, the IXC batches the call record data for all users and submits the data to MasterCard, Visa, American Express etc. for payment.

At that time, payment is made by the credit card companies to the operator of the system, i.e., the company who leases the IXC, the 800 call placement number and contracts with the car rental company to install the cellular phones made in accordance with the principles of the present invention.

At the end of each month, the operator of the system receives bills from the local cellular carrier for all air time used in conjunction with certain cellular phone IDs (TIDs), from the lessor of the 800 call placement number, from the IXC for data management services and from the validation company. The latter bill is based upon the dollar amount validated by the service. The operator of the system then pays these bills.

Returning to the local cellular telephone (circle 228), at local decision step 236, a determination is made whether the power is still being supplied to the cellular telephone. If the NO branch is taken, step 238 clears the telephone call file and step 240 is the end of the local program. If the YES branch is taken, step 240 monitors the Audio TXR line from handset 10 to interface 16. If the user wants to place another call from telephone key pad 26, the DTMF signals will appear on the Audio TXR line. In step 242, interface unit 16 determines whether the input telephone number data conforms to frequency and format (long distance format) and whether the number is a locked out telephone number. In step 246, the newly input telephone number is stored in memory and in step 248 a new telephone call file is formed. Of course, since the credit card data has already been initially locally validated by interface 16 and then subsequently validated prior to completion of the first call by the telecommunications network, the telephone call file stored in interface 16 has the card accepted flag set to YES. Since the card accepted flag is set to YES, actual validation of the credit card by the telecommunications network is not necessary. Accordingly, the local program in interface 16 jumps, via jump point F, to FIG. 2B the transmit call file with timing and echo step 164.

To summarize these major features, the interface unit initially places a call to a specific IXC in a telecommunications network. At the telecommunications network, a protocol has been established such that the cellular telephone will send the network transceiver the cellular telephone ID number (TID) and credit card data. Thereafter, the telecommunications network then calls a credit card validation service to determine, in real time, whether the credit card data is valid and acceptable. Once the credit card data has been validated by the validation and verification service computer, the telecommunications network then obtains the input telephone number from the cellular phone and establishes a further telephonic communications link between the cellular telephone and the telephonic device corresponding to the input telephone number. This is very different from other prior art cellular telephone credit card calling systems.

In the prior art systems, the communications link between the telecommunications network computer or switch and the user of the cellular telephone is disrupted or broken after the initial verification of the credit card. Thereafter, the cellular telephone user must make a second, independent telephonic communications link with the destination telephone device.

FIG. 4 diagrammatically illustrates the major system components of credit card interface unit 16.

The credit card interface unit 16 includes pin connectors 310 and 312 respectively coupled to handset 10 and transceiver 12. Jumper 314 indicates that the 8 lines or wires 8w (FIG. 1) are directly connected to handset 10 and transceiver 12. Please refer to the Pass Through Table set forth above. The Audio TXR-IN signals are fed to a DTMF transceiver. The DTMF transceiver initially decodes the DTMF signals into digitally formatted signals and applies the same to bus 318. DTMF transceiver 316 also is capable of converting or encoding digital signals obtained from bus 318 into DTMF outputs which are applied to amplifiers A1 and A2 (amps 320 and 322). These amplified signals, particularly the amplified signals from amplifiers 322 are fed to the Audio RCR line of the handset via pin connector 310 (as an echo) and applied to Audio TXR line (the Audio TXR-OUT) and pin connector 312 leading to transceiver 12. The Audio RCR is an echo function since the Audio TXR-OUT is fed directly to the transceiver. The DTMF transceiver is sold under model 75T2090.

The digitally formatted signals from DTMF transceiver 316 are processed by processor or CPU 340 which controls read only memory 342, random access memory 346, DTMF transceiver 316, input/output latch or buffer device 348, GAL programmable logic device 350 and input/output latch 349. The CPU is a microcontroller manufactured by Toshiba as TMP84C013A. A Zilog microprocessor can also be used, particularly model 84C013. Bus 318 is a 8 bit bus operating at a speed of 6 MHz. RAM 346 in the working embodiment is a 32K byte RAM and ROM 342 is a 32K EPROM. GAL 350 is a programmable logic device manufactured by National SemiConductor. Particularly, a GAL 22V10 is used. This programmable logic device or GAL has 22 inputs and 10 outputs. The GAL blocks certain signals and enables memory coding and decoding and further enhances the processing of signals and data, thereby reducing the need for extensive processing by CPU 340. ROM 342 stores the initialization program for the system. A power fail detect circuit 352 is coupled to RAM 346 as is a small back up battery 354. In the event power to the cellular phone is lost, power detect circuit 352 is activated which provides enough voltage to RAM 346 to store critical data. The storage of data is used to enable a programmer to change the pass word or the defaults such as removing the electronic locks for transmitting certain telephone numbers. Please refer to the Lock Call Table above.

Input/output latch 348 is sold as a 74HC245 bidirectional buffer. As such, it handles the input and output of data in two directions. I/O latch 348 is coupled to the key pad 360 (user actuation keys A–D) and the credit card reader 362. Returning to GAL 350, the GAL acts as a converter to sense the Send key electronic signal and End key electronic signal on the Data TXR line. GAL 350 also generates those signals and applies the same to transceiver at certain occurrences as described above. For example, when the call placement telephone number is sent via DTMF transceiver 316 to transceiver 12, GAL 350 sends the electronic code representative of the "Send" function key to transceiver 12. Accordingly, transceiver 12 believes that it is communicating directly with handset 10 rather than interface unit 16.

A second input/output latch 349 is coupled to internal bus 318. Input/Output latch 349 is sold as model 74HC373 an acts as a latch to control lights 370 and an input/output device for clock 372. Lights 370 are supplied by a high voltage transformer 374 which converts the 12 volt power signal from power line 376 into a 200 volt peak to peak high voltage signal to drive lights 370. Since lights 370 flash in a sequential manner to prompt the user to slide his credit card through reader 362, I/O latch 349 in conjunction with CPU 340 and ROM controls the sequential driving of those lights.

In order to produce the voice prompts, credit card interface 16 includes a voice processor 410. In the working embodiment, voice processor 410 is a Toshiba Voice Recording unit TC8830F which permits voice recording and play back using adaptive voice modulation. Voice processor 410 is a processor which encodes, decodes and enables voice recording into memory 412. Memory 412 is sufficient to record 4M bits which is equivalent to approximately eight minutes of speech. In the working embodiment, memory 412 is a read only memory but may be configured as a random access memory. GAL 414 is used for memory encoding and decoding and to provide additional addressing of the memory. GAL 414 enables decoding of certain address lines and interleaving of data into the CPU cycle. In the working embodiment, the voice processing and synthesis circuit (including processor 410, GAL 414 and memory 412) is placed on a separate circuit board as compared with the other components as shown in FIG. 4. Of course, the components shown in FIG. 4 must be supplied power which is obtained from an appropriate transformer not shown in the drawings but known to persons in the ordinary skill of the art. The transformer is coupled to power line 376.

To simplify the electronic interface, it may be preferable to omit the voice response circuitry. Further, an input/output (I/O) unit 341 may be coupled to bus 318. The I/O unit 341 is further coupled to an input/output jack or port 343. Port 343 may be a serial communications port which enables the manufacturer to upload or download data and commands or instructions into ROM 342 and RAM 346. As is known in the electronic arts, the programs, commands and instructions may be stored in RAM 246, ROM 342 and GALs 350, 414 somewhat interchangeably.

Because of the flexibility of the system, the present cellular telephone calling system also enables third parties to call the user after the user has logged into the cellular network. Although this seems to be quite simple, in fact, the user's credit card are billed for this third party call. This is dissimilar to other calling card systems. The Third Party Call Table shown below exemplifies this feature.

Third Party Call Table

1. User calls third party (after credit card validation) and provides third party with cellular telephone number and special network number (800#)
2. Disconnect
3. Third party calls network number
4. Voice or tone prompts third party to input user's cellular phone number
5. Call detail record file formed at network
6. File linked to user's credit card number
7. Network completes telephone communications link with user and third party
8. Disconnect
9. Network completes call detail record file (time and billing)
10. User's credit card billed Once the user has called into the cellular network and his credit card has been validated by the network, the user must call the third party and provide the third party with a certain call placement number for the cellular network (having the uniquely configured network transceiver) as well as the user telephone number. Thereafter, the user and the third party disconnect that telephonic communications link. The third party then calls a predetermined third party call placement number for the network. A voice prompts the third party to input the user's cellular telephone number. The third party uses a TOUCH-TONE type phone to generate the correct DTMF signals which represent the user's phone number. Since the user's cellular telephone number has been previously linked to a credit card and that credit card has been validated by the system, a call detail record is formed in the cellular telephone network which provides a correspondence between the incoming third party call and the user's credit card. That call detail record is generally similar to the Call Detail Record Table set forth above. The call detail record notes the time and day and length of that third party call. After the detail record is formed, the cellular network then calls the user's cellular telephone. After the call between the user and the third party is over, the network completes the call detail record. This entails determining the total length of this third party telephone call and rating the call. Thereafter, the cellular telephone network bills the user's credit card.

OUTGOING PROTOCOL AND EVENTS DESCRIPTION

After a credit card has been swiped through the credit card reader, the interface controller validates the card by taking two actions. First, a Luhn's modulus calculation is performed to verify the integrity of the card number read by the system. Secondly, the expiration date is checked against the content of the internal real time clock. If any of these tests fail, a voice message is issued to inform the user of the abnormal condition.

If the aforementioned tests are successful, the controller will compare the number just read against the credit card number stored in its internal memory. If the numbers are found to be different, the content of the internal database will be replaced with the new number and a "PHONE USED" flag will be cleared to indicate that the credit card just read has not been used. On the other hand, if both the new number and the previously stored numbers are found to be the same, no further verifying actions are taken.

In either case, the controller waits until a valid phone number is entered via the handset. When an allowable phone is entered, the following events will take place:

| CELLULAR PHONE | CENTRAL SWITCH |
|---|---|
| STEP 1 | |
| The controller takes the phone off hook and dials a ten-digit number (i.e., a 1-800-XXX-YYYY) to contact the central switch location. | The central switch responds by sending a Dial tone for two seconds, as an indication that it is ready to receive data. |
| STEP 2 | |
| Upon receiving the Dial Tone from the switch, the controller will send a string of dual tone multi-frequencies (DTMF) containing the following information: Two tones indicating the number of succeeding tones (not including the number of the checksum tones) plus A variable number of tones containing the cellular phone identification number plus Four tones containing the checksum of the string of DTMF characters. | When the number of tones specified by the first two tones of the incoming string are received, the switch calculates the checksum of the received data. If the checksum is correct, the switch then proceeds to validate the ID number contained in the incoming string. If the ID number is found to be valid, the switch will respond with an ACK tone. Otherwise, a NAK tone will be sent out as an indication that either the received ID or the checksum failed the validation test. |
| STEP 3 | |
| If a NAK tone is received two distinct events may occur: First, if a pre-defined maximum number of retries has not been exceeded, the step 2 will be repeated. Second, if the maximum number of retries has been exceeded, the controller will terminate the phone call, and a voice message will be played to inform the user about the abnormal condition. If an ACK is received, the controller will proceed with step 4. | |

-continued

| CELLULAR PHONE | CENTRAL SWITCH |
|---|---|
| STEP 4 | |
| If the "PHONE USED" flag is found to be clear, the controller will send the following information. Two tones indicating the number of succeeding tones (not including the number of the checksum tones) plus A variable number of tones containing information pertaining to the credit card number, expiration date, etc. plus Four tones containing the checksum of the string of DTMF characters. If the "PHONE USED" flag is set, this is an indication that the credit card has already been used by the cellular phone, and the credit card information described in this section should not be sent to the central switch, therefore the controller will proceed to the step number 6. | When the number of tones specified by the first two tones of the incoming string are received, the switch calculates the checksum of the received data. If the checksum is correct, the switch then proceeds to validate the credit card number and any other associated information. Notice that the central switch does not need to verify the expiration date, since this check is done by the controller when the credit card information is read. If the credit card information is found to be valid (i.e., availability of credit, etc.), the switch will respond with an ACK tone. Otherwise, a NAK tone will be sent out to indicate that either the credit information or the checksum failed to pass the tests. |
| STEP 5 | |
| If a NAK tone is received two distinct events may occur: First, if a pre-defined maximum number of retries has not been exceeded, the step 4 will be repeated. Second, if the maximum number of retries has been exceeded, the controller will terminate the phone call, and a voice message will be played to inform the user about the abnormal condition. If an ACK is received, the controller will proceed with step 6. | |
| STEP 6 | |
| The controller sends the following information. Two tones indicating the number of succeeding tones (not including the number of the checksum tones) plus A variable number of tones containing the destination number. plus Four tones containing the checksum of the string of DTMF characters. If the "PHONE USED" flag is set, this is an indication that the credit card has already been used by the cellular phone, and the credit card information described in this section should not be sent to the central switch, therefore the controller will proceed to the step number 6. | When the number of tones specified by the first two tones of the incoming string are received, the switch calculates the checksum of the received data. If the checksum is correct, the switch will respond with an ACK tone, and proceed to dial out the destination number, establish the communication link between the originator and the destination phone, and record all pertinent information for the phone billing. If the checksum fails, a NAK tone will be sent out to request the destination number again. In very rare occasions, the central switch may deem necessary to request all the information again (perhaps because it cannot find a credit card number associated with the phone ID). In such a case, a REQUEST ALL INFORMATION tone will be sent out to the controller, to request the full information from the controller unit. |

-continued

| CELLULAR PHONE | CENTRAL SWITCH |
|---|---|
| STEP 7<br><br>If a REQUEST ALL INFORMATION is received, the controller will clear the "PHONE USED" flag and repeat all steps 4, 5, and 6.<br>If a NAK tone is received, two distinct events may occur:<br>First, if a pre-defined maximum number of retries has not been exceeded, step 6 will be repeated.<br>Second, if the maximum number of retries has been exceeded, the controller will terminate the phone call, and a voice message will be played to inform the user about the abnormal condition.<br>If an ACK is received, the controller will connect the phone call to continue until the call is terminated or until the END key is pressed on the handset unit. | |

THIRD PARTY PROTOCOL AND EVENTS DESCRIPTION

The system supports two modes of operation. In the first mode, phone calls are originated by the user to the location where the Cellular World's phone controller (the IXC) is located. The user may be in a rental car, limousine, and the like.

The second mode of operation arises when the party originating the call is not the one that physically possesses the phone controller (i.e., not the user), but is a third party at a remote location. The third party may originate a call from an ordinary TOUCH-TONE telephone. For this mode of operation to work, it is indispensable that the user's phone controller (the device to which the phone call is being made) already contains validated credit card information (a post-validation call), and that this information has been conveyed to the central switch computer (IXC) by means of a phone call (the first phone call). In other words, the user must make at least one phone call, so that the IXC can register the phone controller identification number (ID) and the credit card number linked to it.

As an illustration of the second mode of operation, assume that the user and the phone controller unit is located in a rental car, and the phone number for this device is 1-305-AAA-BBBB. The user rents this car, then swipes a valid credit card through the card reader device, and places a phone call to another telephone number (1-817-CCC-DDDD). When the phone call is established, the IXC computer saves in its database the ID of the originating device, along with the number of the credit card used to perform this transaction. In this hypothetical scenario, the user informs the person at the remote location that in order to contact him or her the following procedure must take place:

1) The third party will dial a 1-800-XXX-YYYY number of the IXC.
2) When the IXC answers, either through a human or a machine, the third party will then inform the IXC of the user's phone number (e.g., 1-305-AAA-BBBB).
3) The computer at the IXC location will then verify that the desired phone number is linked to a valid credit card. When the information is verified, the IXC computer will proceed to call the desired location (that is, the 1-205-AAA-BBBB destination number). In contrast, if the information cannot be verified, the third party caller is informed that the desired number is not active and the call should be tried again with a different number.
4) When the cellular phone rings, the controller will take the phone off-hook and transmit an answer tone to the IXC computer, for a pre-defined period of time, such as two seconds.
5) Upon detection of this answer tone, the IXC computer will send an identification code to the cellular phone controller. The controller then checks this ID code against its own internal ID. If both codes match, the controller will allow the phone call to be completed. Otherwise, the controller will hang-up the cellular phone.
6) If the phone call is successfully established between the user and the third party, the IXC will record the duration of the call for billing purposes. When the phone call is terminated, the IXC will call a credit card authorization agency (VISA, MasterCard, etc.) and obtain an authorization number to charge the phone transaction. On the opposite side, if the phone call failed, the IXC will inform the originating device of this irregularity.

As can be seen, the second mode of operation allows a third party at a remote location to contact a user's cellular phone through the credit card calling system described herein.

The credit card interface and controller can be integrated into a unitary cellular phone, that is, as part of the circuitry that detects keys pressed on the keypad, sends and receives DTMF tones in the circuit, sends information to the display, and communicates with the transceiver circuitry. Similar to the stand-alone interface unit 16 in FIG. 1, the central processing unit (CPU) in FIG. 6 is responsible for reading and managing data received from the credit card reader, and communicating with the telecommunications network transceiver, particularly the Inter Exchange Processor (IXC), in order to validate and allow the full telephone link to be established.

Figure 6:
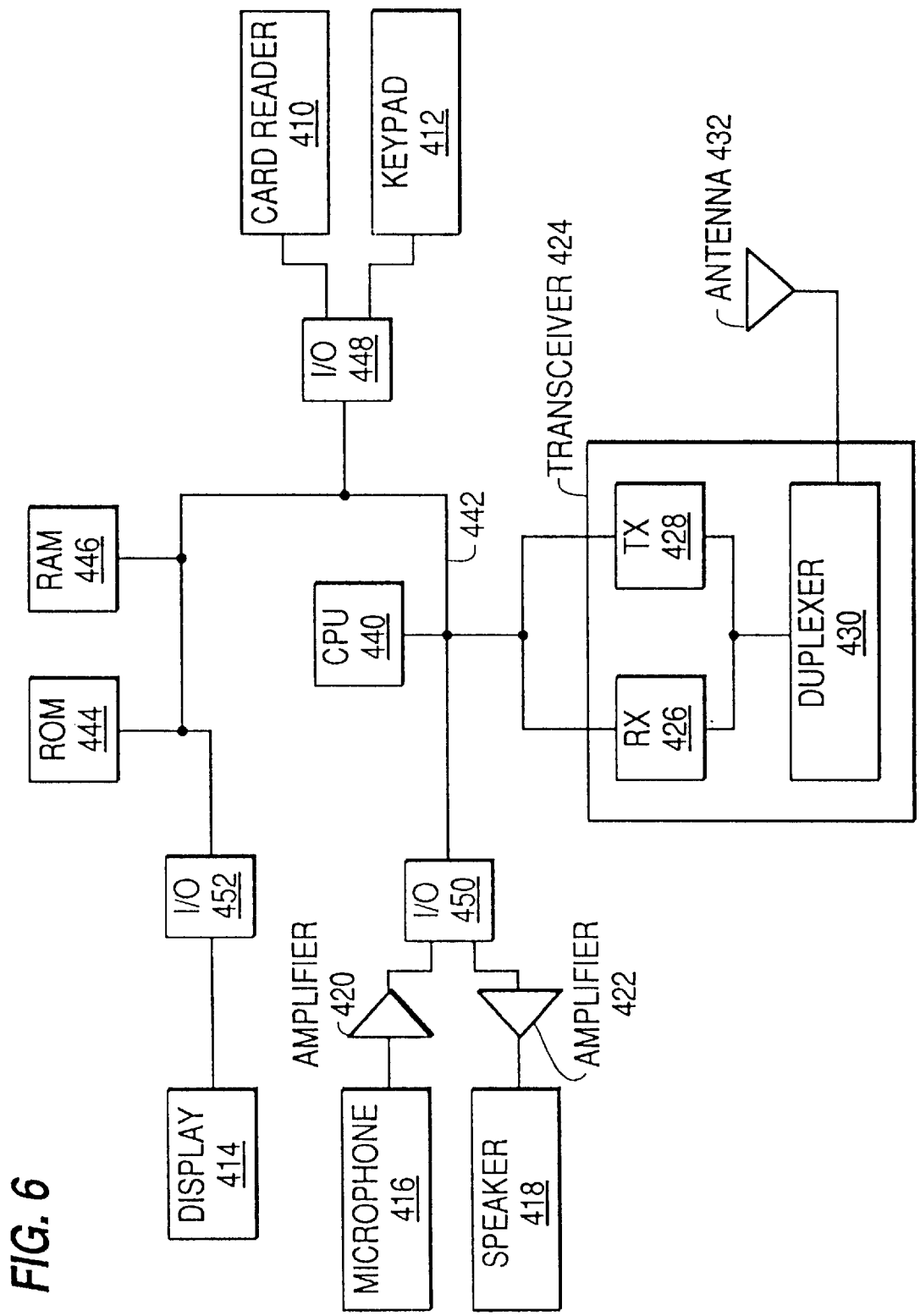
FIG. 6 diagrammatically illustrates the major system components of a cellular telephone having an integrated credit card reader therein.

FIG. 6 diagrammatically illustrates a unitary or one piece cellular phone with a built-in credit card reader 410, user keypad 412 (enabling the user to input destination phone numbers, and Send, End and other function commands commonly found on cellular phone handsets), display 414, microphone 416 and speaker 418. The microphone and speaker signals are amplified and conditioned to the appropriate level and state by amplifiers 420, 422. The unitary phone includes a transceiver 424 having receive unit RX 426 and transmit unit TX 428. These units are coupled to a duplexer 430 such that the signals are sent to and received from antenna 432.

The central processing unit or CPU 440 is coupled to an internal signal and communications bus 442 and to ROM 444, RAM 446, and various Input/Output modules(I/O) 448, 450 and 452. Additionally, the CPU communicates with transceiver 424 thereby sending DTMF signals over the cellular phone carrier to the IXC in the telecommunications network to validate the user's credit card data. Transceiver 424 may further include signal buffers or conditioners.

Another embodiment of the present invention relates to a method of operating a cellular telephone system by charging the user's credit card and a cellular telephone calling system with a credit card call accounting and billing component.

Figure 7:
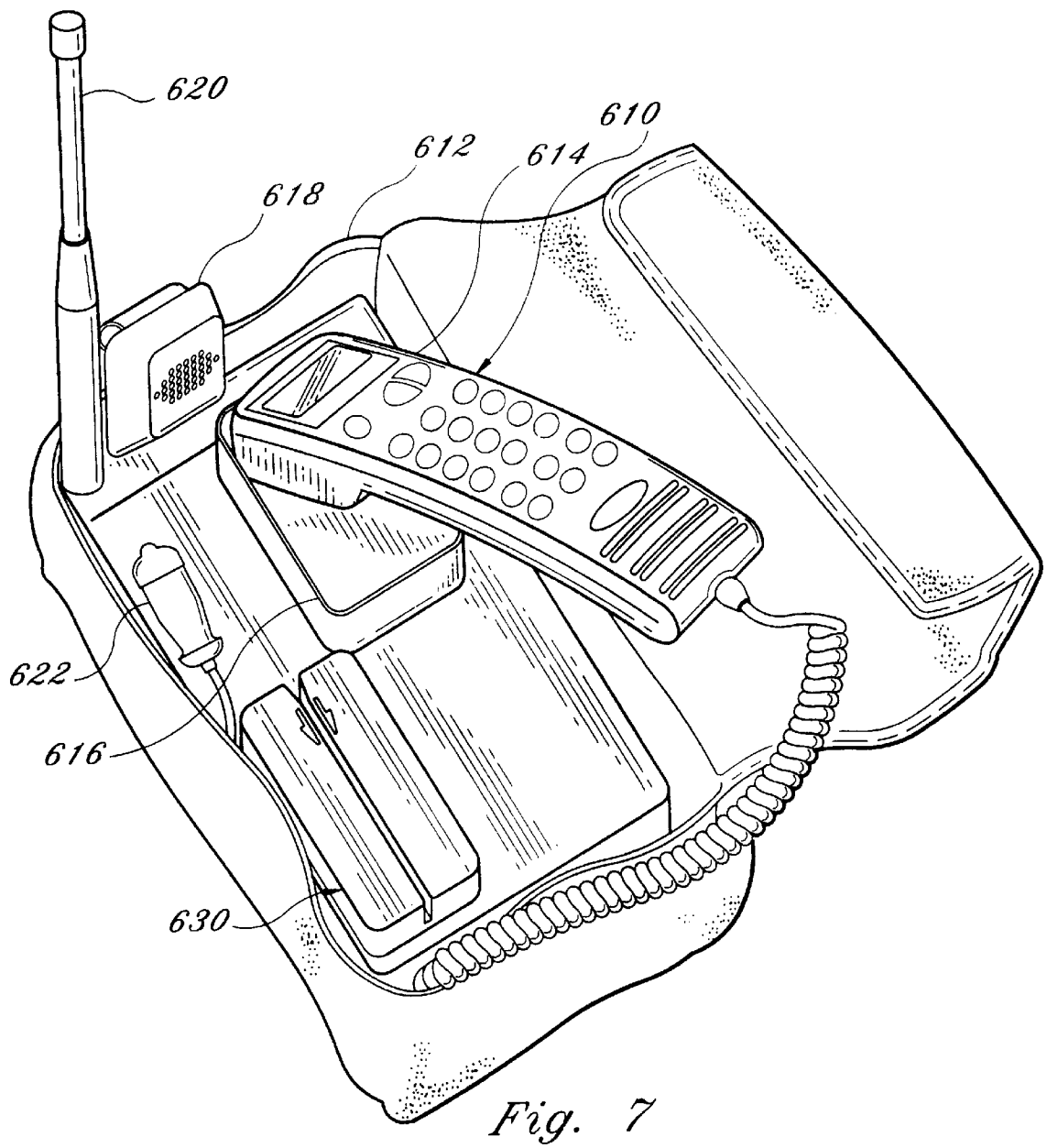
FIG. 7 illustrates the portable cellular telephone with a credit card debit interface in a bag or carrier.
Figure 11:
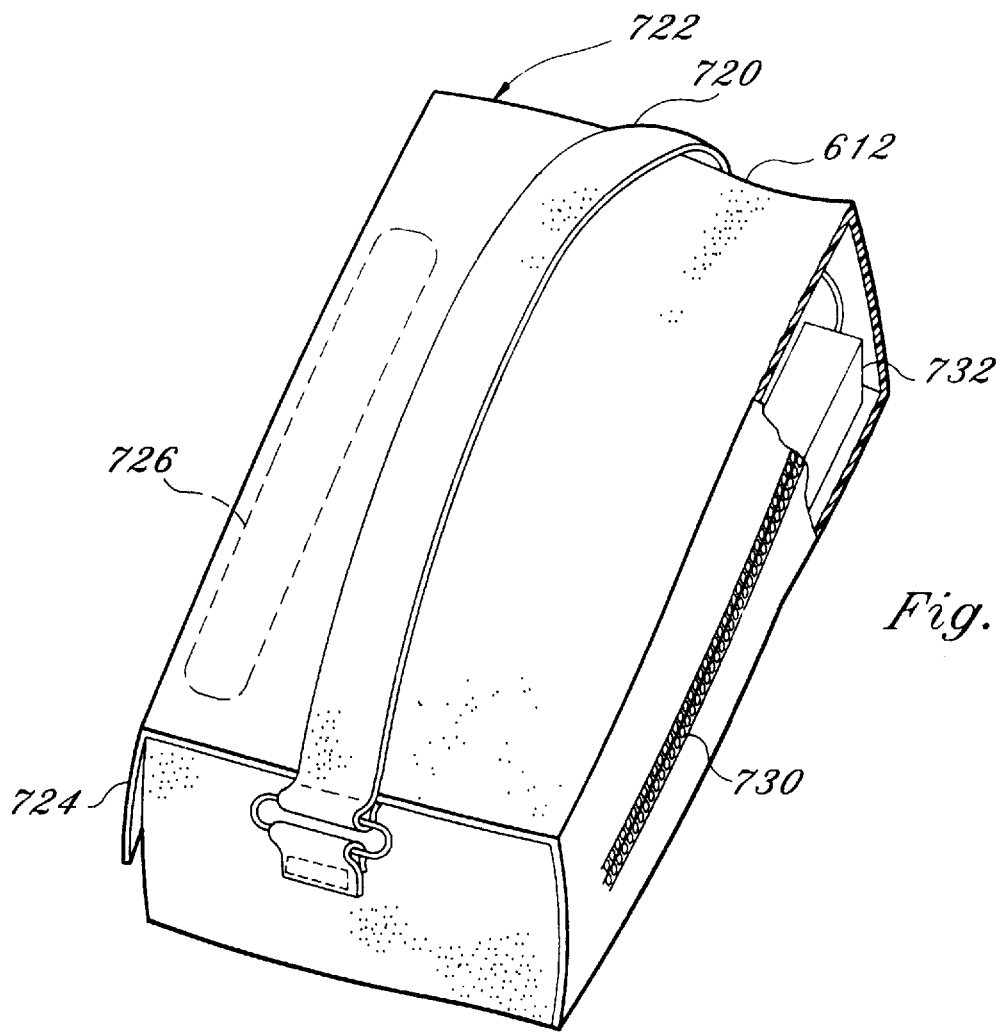
FIG. 11 diagrammatically illustrates the portable phone in a bag.

FIG. 7 diagrammatically illustrates a portable cellular telephone 610 which is carried in a bag 612 by the user. The portable cellular telephone 610 includes a handset 614, a cradle 616 for handset 614, a microphone 618, an antenna 620 and a cigarette lighter adapter plug 622. Not shown in FIG. 7 but shown in FIGS. 11 and 12 is a rechargeable battery 732. These components are commonly provided to users of cellular telephones.

However, the present invention includes an interface 630 which collectively monitors, blocks, modifies and passes certain data and commands between handset 614 and the transceiver (not shown in FIG. 7) for cellular telephone 610.

Similar numbers designate similar items throughout FIGS. 7–12.

FIG. 8 diagrammatically illustrates a partial, perspective view of cellular telephone 610 including interface 630. Bag 612 is diagrammatically illustrated in FIG. 8.

Handset 614 includes a spiral electrical cord 640 which is plugged into interface 630. Interface 630 includes interface electronics 642 and credit card data input device which, in this embodiment, is a credit card reader 644. Other credit card data input devices could be used, such as a keypad. The interface electronics unit 642 is electrically connected via electrical cable 645 to cellular telephone transceiver 646.

As shown in FIG. 8, antenna 620, while in the stored mode, lays flat generally atop credit card reader 644. When in use, antenna 620 can be raised as shown in position 621 in FIG. 8.

Microphone 618 enables the user, after he or she inputs the destination telephone number and the credit card information, to use cellular telephone 610 in a hands-free operation. Such hands-free operation is beneficial if the phone is used in an automobile. When in an automobile, the phone shown in FIG. 7 is quite useful in that the phone can be placed in use in the automobile in an extraordinarily short time and can be moved to the trunk if the user wishes to store the phone. These advantages are not available if the phone is permanently mounted in the automobile.

Credit card reader 644 includes slot 648. The user inputs credit card information or data by swiping his or her credit card through slot 648. The reader, in the illustrated embodiment, includes three lights, green, yellow and red, which provide visual prompts to the user.

An important feature of the present invention is that interface 630 is simply an add-on device to the portable cellular telephone 610. Customarily, handset cord 640 is plugged directly into cellular telephone transceiver 646. Instead of directly connecting cord 640 into cellular telephone transceiver 646, electrical interface 642 acts as a buffer to monitor, block, modify and pass certain signals normally passing between handset 614 and cellular telephone transceiver 646. These signals are discussed earlier in connection with the Pass-Through Table and in connection with FIG. 1. In particular, interface 630 monitors, blocks, modifies and passes audio transmission signals, audio received signals, data transmission signals and data received signals. In general, transmission signals are outbound signals from handset 614 to cellular telephone transceiver 646. Inbound signals are designated "received signals" from transceiver 646 to handset 614.

In one working embodiment, cellular telephone 610 is a Motorola portable cellular telephone operating at three watts. The interface electronics 630 is simply added to the Motorola portable cellular phone and the cord 640 from handset 614 is unplugged from transceiver 646 and plugged into electronic unit 642 of interface 630. Additional jumper cord 645 is plugged into interface electronics 642 and also plugged into portable cellular telephone transceiver 646. It is an important feature of the present invention that the electronics in the cellular telephone transceiver are not physically modified by the invention.

Figure 9:
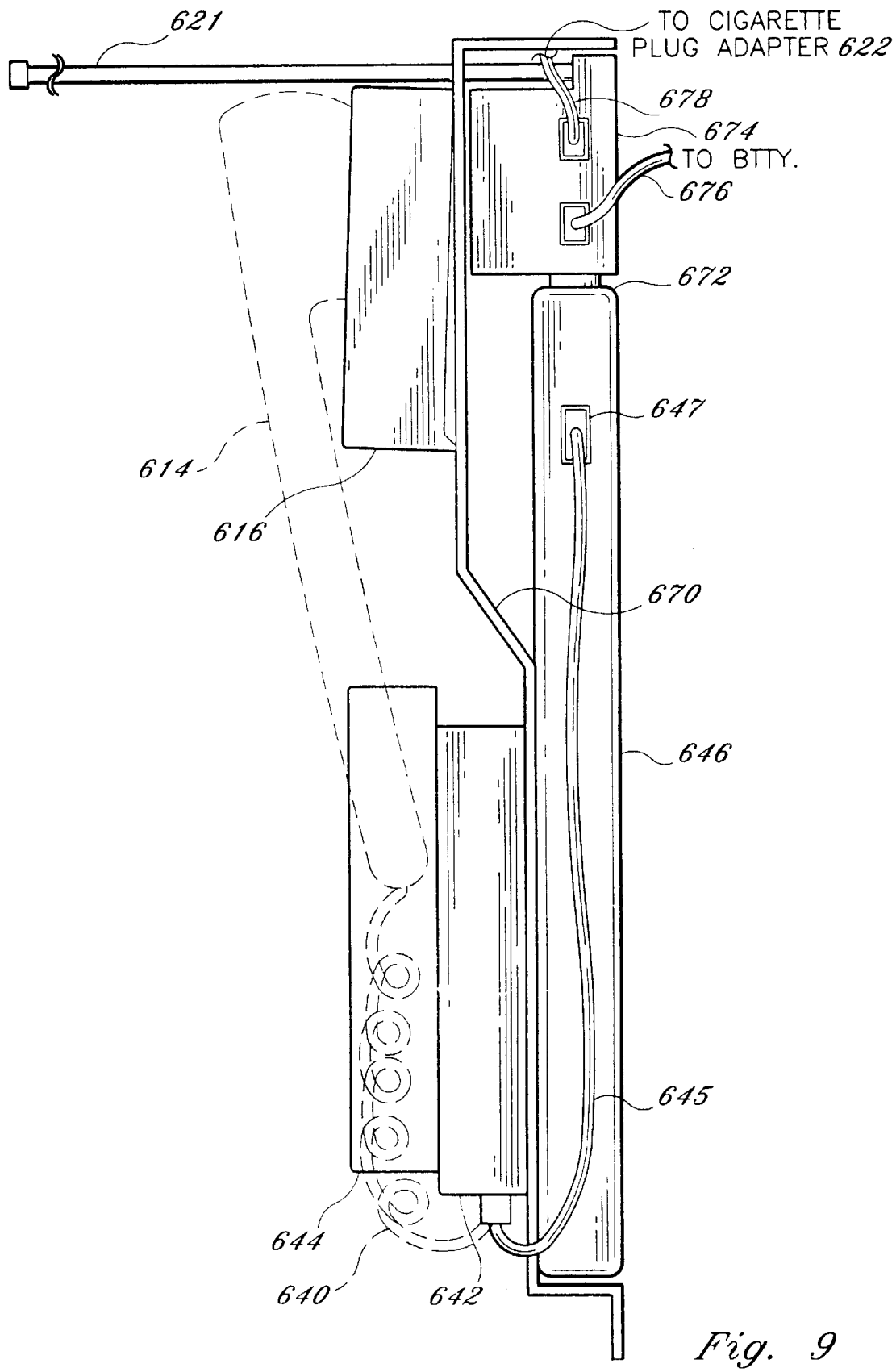
FIG. 9 diagrammatically illustrates the handset cradle atop the cellular phone transceiver and the credit card and electronic control interface mounted on the transceiver.

FIG. 9 diagrammatically illustrates a side view of the portable cellular telephone and the associated credit card interface.

The cellular telephone transceiver 646 is electrically connected to interface electronics unit 642 via multi-wire cable 645. Transceiver unit 646 is mounted below a plate 670. On top of plate 670, electronic interface unit 642 is mounted. Further behind electronic unit 642 is mounted credit card reader 644. In FIG. 9, handset 614 is shown in dashed lines as is handset cord 640. Handset 642 rests in cradle 616.

Cellular telephone transceiver 642 is purchased from Motorola and the upper portion 672 of transceiver unit 646 is electrically connected to supplemental interface 674. Supplemental interface 674, supplied by Motorola with the portable cellular telephone, includes a battery power cable 676 and a cigarette lighter plug cable 678. In this illustrated embodiment, antenna 621 has been elevated.

It is important to note that in order to construct the present invention, a portable cellular telephone is purchased from one of the major manufacturers of such phones. The electronics in the portable cellular telephones are not altered. Instead, the electronic interface unit consisting of credit card reader 644 and electronic interface 642 is mounted to cellular telephone transceiver 646. This mount is accomplished by mounting bracket 670. Cradle 616, handset 640 and handset cord 640 are provided by the manufacturer of the cellular telephone. Rather than having handset cord 640 run directly into transceiver 646 at port 647, the handset cord 640 is unplugged from port 647 and plugged into electronic interface 642. Jumper cable 645 is then plugged into electronic interface unit 642 and is further plugged into port 647. In this manner, the electronic interface 642 monitors, blocks, intercepts, modifies and passes the audio transmission signals, audio received signals, data transmission signals and data received signals between the handset and the transceiver unit.

Figure 10:
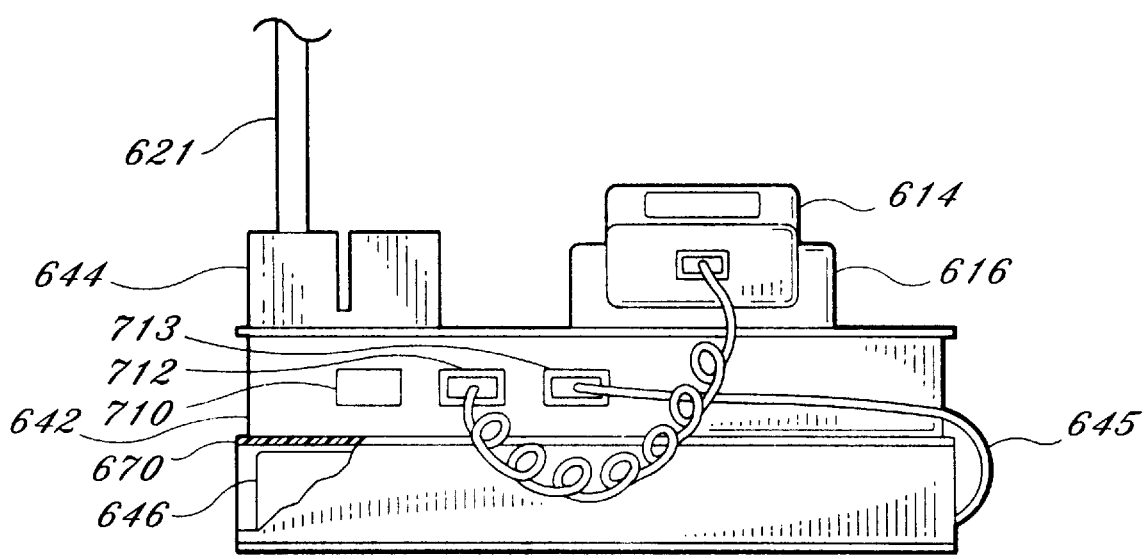
FIG. 10 diagrammatically illustrates an end view of the portable cellular telephone.

FIG. 10 diagrammatically illustrates a side view of the credit card cellular telephone. In this view, portable cellular telephone transceiver 646 is mounted below plate 670. This is shown in the partial, broken-away view in the lower left portion of FIG. 10. Interface electronics 642 includes ports 710, 712 and 713.

Port 712 accepts handset cord 640. Port 713 accepts jumper cable 645.

Open port 710 is available as a serial input port or as a data transfer port similar to the one described in connection with FIG. 4, port 346 and input/output interface 341.

FIG. 11 shows the portable cellular telephone encased within carrying case or bag 612. Bag 612 includes a handle 720 and a top 722 with an overlying flap 724. On an internal portion of overlying flap 724, a hook and loop attachment mechanism 726 is provided. This hook and loop attachment mechanism may be a VELCRO attachment.

FIG. 11 also shows a zipper 730 which permits access to cellular telephone battery 732. Battery 732 is connected to transceiver 646 (not shown in FIG. 11) via battery cable 676.

FIG. 12 diagrammatically illustrates the electrical connection between the systems.

Handset 614 includes display 810, alpha-numeric input keys 812, command keys 814 and speaker region 816.

In operation, the credit card portable cellular telephone is turned ON by the user by depressing the appropriate key in command keys 814. At that time, a plurality of lights (see FIG. 7) will blink in sequence. These blinking lights are, in one working embodiment, green, yellow and red. This provides a visual prompt to the user to swipe his or her credit card through credit card reader 644.

Further, until the user swipes the credit card through reader 644, a visual indicator LOCKED will be shown on display region 810 of handset 614. Other types of visual displays could be shown to the user to indicate to the user that the phone is not available until he or she swipes the credit card through reader 644.

In an emergency, the user may select 0 as an emergency number or "911" as an emergency number. Interface electronics 640 passes these emergency signals from handset 614 to transceiver unit 646. In all other instances (unless other emergency call numbers are programmed into electronic unit 642) the cellular telephone is locked and cannot be used. This is accomplished by the electronic interface monitoring the audio TXR and audio RCR and data TXR and data RCR signals on the communications bus which normally consists of cable 640 running normally between handset 614 and transceiver 646. However, the electronic interface 630 intercepts, monitors and blocks those data and audio signals between the handset and the transceiver unit 646. This is described earlier in connection with FIG. 4.

Upon inputting the credit card data by swiping the credit card, interface electronics 642 does a local validation check. This local validation is explained above and consists of checking the expiration date of the credit card and the data input sequence.

At this time, the green or first light is illuminated on credit card reader 644 (see FIG. 7) indicating to the user that he or she should dial a telephone destination number. Further, display 810 could show "Dial" to visually prompt the user to input the destination telephone number. Thereafter, the electronics in electronic interface 642 gathers credit card data, the destination telephone date and further inserts a predetermined call placement telephone number into the electronic file. Concurrently therewith, the intermediate or yellow light is illuminated on credit card reader 644. This indicates that the credit card cellular telephone is currently accessing the telecommunications network. It is a WAIT indicator.

If the user does not input a credit card within a predetermined time period (about 1 minute), the portable telephone goes into a SLEEP mode which reduces energy consumption. Activation of any key WAKES UP the phone.

The electronic interface 642, after input of the credit card data, then compiles at least the call placement telephone number, the credit card data and the destination telephone number as well as the electronic identification number for the cellular telephone (sometimes referred to as ANI of the phone). Further, it may be appropriate to insert the merchant identification number (MID) into this call processing file by the electronic interface 642. This is described earlier herein.

Thereafter, electronic interface 642 inserts this information and sends it via the telecommunications bus formed by cables 640 and 645 to cellular telephone transceiver 646.

The call placement telephone number enables the cellular telephone to dial a predetermined transceiver network switch in the telecommunications network. In a preferred embodiment, this predetermined call placement telephone number is an 800 number. At that telecommunications network or node, the credit card data, destination telephone data, MID and cellular telephone identifier ANI are uploaded. This occurs substantially in a single data transfer. Immediately upon receipt of this information, the telecommunications switch opens a daily transaction report as shown in the Daily Transaction Report Table set forth below.

Daily Transaction Report Table

| | Rcd. 1 | Rcd. 2 | Rcd. 3 |
|---|---|---|---|
| Phone number | 984-333-3333 | 864-444-4444 | 777-999-8888 |
| Date | 10-1-95 | 10-1-95 | 10-1-95 |
| Time | 18-2 | 20-15 | 8-40 |
| Minutes | 4 | 1 | 1 |
| Rate class | 3 | 3 | 3 |
| Type | 0 | 0 | 0 |
| Phone destination | 987-111-2222 | 784-333-7777 | 816-111-1111 |
| Expiration date | 3-96 | 6-98 | 3-97 |
| Credit card number | 14 digits | 16 digits | 17 digits |
| From city | Ball | Newark | New York |
| From state | NJ | NJ | NY |
| To city | Italy | Norwalk | Queens |
| To state | | CT | NY |

At that network node, the telephone number of the cellular telephone is identified. This is obtained by correlating the ANI of the cellular telephone with the unique cellular telephone number. See record or RCD 1 in the Daily Transaction Report Table set forth above. The computer at the telephone switch inputs the current date and time. Further, the switch identifies the rate (discussed below) and type of telephone calls as well as the telephone destination number.

The expiration date of the credit card is also logged into the Daily Report Table as well as the credit card number. In the Daily Report Table set forth above, credit card numbers are not provided but may consist of a long string of digits or alpha characters.

The Daily Transaction Report Table further logs in the city from which the portable cellular telephone is calling as well as the state.

At that time, the network or node calls the credit card validation service. This enables the network node and the computer at the network node to verify that the credit card is available for telephone charges and the user will be charged for the use of the telephone on his credit card. After the validation service (normally located at a long distance away from the telecommunications network node or switch) verifies that the credit is available. This verification or confirmation information may be logged into the computer system at the telecommunications network node or telephone switch. An additional field may be added to the Daily Transaction Report Table for this confirmation number.

After confirmation of the validity of the credit card, the telecommunications switch completes the call from the portable cellular telephone to the destination number. At that time, the to city and to state fields are updated. Further, the telecommunications node begins counting the minutes of the call.

It is known that telephone calls are rated and the charge for each telephone call is based on the rate category. The Exemplary Rate Table set forth below shows some rates that may be applicable.

Exemplary Rate Table

| Rate No. | Time | Charge |
|---|---|---|
| 1 | M–F 8:00 a.m.–6:00 p.m. | .85 per minute |
| 2 | M–F 7:00 p.m.–9:00 p.m. | .75 per minute |
| 3 | All other times | .65 per minute |

Further, it is well known that there are several types of calls which the user of the portable cellular telephone may initiate. The Exemplary Type Chart set forth below provides a general understanding of these types of calls which may be placed by users.

| | Exemplary Type Chart |
|---|---|
| Type 0 | Swipe credit card of portable phone |
| Type 1 | Operator assisted person to person |
| Type 2 | Operator assisted third party call |
| Type 3 | Operator assisted credit calling card |
| Type 4 | Operator assisted collect calls |

Type 0 is the common credit card driven cellular telephone call. Types 1–4 all involve a live operator assisting the caller. In Type 1, the operator places a person-to-person call. In the present invention, if the user depresses a 0, a live operator will answer the phone. The operator will then request information regarding the destination telephone number, the credit card number, the expiration date, and update the Daily Transaction Report Table set forth above. Types 2–4 of the calls are various operator-assisted calls, such as a call billed to a third party, operator-assisted credit card call or operator-assisted collect calls. Although the third party calls and collect calls are not directly billed to the credit card number, there is a charge for those calls assessed to the user of the credit card driven cellular telephone.

After the user of the cellular telephone terminates the call to the called destination, the Daily Transaction Report Table is updated and the minutes field is assigned. At the end of the day, the Daily Transaction Report Table is processed together as a batch and the bills for the credit card charges for each call made by the user are electronically sent through a credit card clearinghouse. For example, there is a credit card clearinghouse for American Express, MasterCard, Visa and Discover. Those credit card clearinghouses commonly electronically transfer money to the vendor to pay for the goods or services received by the user. In this manner, the provider of the cellular telephone services is identified by the merchant identification number transmitted in connection with the Daily Transaction Report Table. The MID is not shown with the Daily Transaction Report Table but is discussed above in connection with the other figures. After the electronic funds have been transferred to the provider of the credit card cellular services, that service provider then further distributes funds to companies who lease the portable cellular telephones to the user. The companies who lease or rent the portable cellular telephones to the users may generally be categorized as wholesalers. The Monthly Report Table "0+" and Monthly Report Table "0–" set forth below provide some indication of the types of report which are distributed to the wholesalers of the credit card cellular telephones.

| Monthly Report Table "0+" | | | |
|---|---|---|---|
| Cellular Company | Minutes | Amount | Totals |
| Credit card originated calls Traffic Period 7/1–7/31/95 | | | |
| Actual airtime - $1.95/minute less uncollectible calls minutes (6,462 – 190 = 6,272 collected minutes) | 6,272 | $12,230.40 | |
| Completed calls - $1.95/call less incomplete calls of 376 less uncollectible number of calls 46 (1,560 – 376 – 46 = 1,139 calls) | 1,139 | 2,221.05 | |
| TOTAL REVENUE EARNED | | | $14,451.45 |

| Monthly Report Table "0+" | | | |
|---|---|---|---|
| Cellular Company | Minutes | Amount | Totals |
| Less: Calls service fees | | | |
| Completed calls - $0.50/minute | 6,272 | –3,136.00 | |
| Completed calls - $0.50/call | 1,139 | –569.50 | |
| Incomplete calls - $0.40/incomplete | 376 | –150.50 | |
| TOTAL CHARGES | | | –3,855.90 |
| TOTAL CREDIT CARD ORIGINATED CALLS | | | $10,595.55 |

| Monthly Report Table "0–" | | | |
|---|---|---|---|
| Cellular Company | | Minutes Amount | Totals |
| Operator assisted calls Traffic period 8/1–8/31/95 | | | |
| Type 1 | | | |
| Operator assisted person to person Actual airtime - $1.95/minute | | 0 $0.00 | |
| Person to person surcharge - $2.25/call | | 0 0.00 | |
| Type 2 | | | |
| Operator assisted third party call Actual airtime - $1.95/minute | | 61 118.95 | |
| Third party billing surcharge - $2.25/call | | 12 27.00 | |
| Type 3 | | | |
| Operator assisted credit card call Actual airtime - $1.95/minute | | | |
| Less uncollectible charge calls (320 – 6 = 314) | | 314 612.30 | |
| Calling card surcharge - $2.25/call | | | |
| Less uncollectible calls (55 – 4 = 51) | | 51 114.75 | |
| Type 4 | | | |
| Operator assisted collect calls Actual airtime - $1.95/minute | | 308 600.60 | |
| Collect call surcharge - $2.25/call | | 71 159.75 | |
| TOTAL REVENUE EARNED | | | $2,450.35 |
| Less: Calls service fee | | | |
| Operator assisted - $0.50/minute | | 683 –341.50 | |
| Person to person - $0.85/call | | 0 0.00 | |
| Third party - $0.85/call | | 12 10.20 | |
| Calling card - $0.85/call | | 51 43.35 | |
| Collect calls - $0.85/call | | 71 60.35 | |
| Incomplete calls - $0.40/call | | 782 312.80 | |
| TOTAL CHARGES | | | –768.20 |
| AMOUNT REMITTED | | | $ 1,682.15 |

The Monthly Report Table is generated by the provider of the cellular telephone service. The report table includes the period of the report and information regarding the amount of airtime and the charges associated with the airtime. Under current Federal Communications Commission rules, users cannot be charged for incomplete calls. Further, there is a certain amount of uncollectible calls that every provider who accepts credit cards must accept. Accordingly, the total calls in the Monthly Report Table is reduced by the uncollectible call minutes. The actual airtime rate is also shown. Each call has not only an airtime charge but also an access charge. The airtime charge in the Monthly Report Table "0+" is $1.95 per minute. The access charge is $1.95 per call. The "0+" is the table which shows the amount of revenues generated by the system when the user inputs his or her credit card through the credit card reader. The "0–" table, discussed later, are the operator-assisted calls.

The Monthly Report Table "0+" also shows the charge provided by the cellular telephone network for each call per minute ($0.50 per minute), the number of access charges ($0.50 per call) and the charge for incomplete calls. Under current regulations, users cannot be charged for incomplete cellular calls. However, the wholesalers of the credit card driven portable cellular phones are charged for such calls. The Monthly Report Table "0+" then shows the gross revenue earned by the wholesaler as total revenue earned less the total charges to that wholesaler based on the airtime and access charges.

The Monthly Report Table "0–" shows each type of operator-assisted calls, Type 1–4, the charge per minute and the access calls (see Type 1, $1.95 per minute airtime, $2.25 per call access). The total revenue earned is also shown in the Monthly Report Table "0–". The charges for operator-assisted airtime charges and access charges for person-to-person, third party, etc. is also shown above.

The present invention is quite useful because it is not necessary to reconfigure any electronics in the portable cellular telephones sold by manufacturers of those phones. It is only necessary to interpose electronically the electronic interface unit 630 which includes electronic interface 642 and credit card reader 644.

It is also critical in the present invention that the credit card of the user must be validated before the call to the destination telephone is actually completed.

As a further enhancement to the present system, the user can place a deposit for the credit card driven cellular telephone as follows. At the providing location, such as a car rental agency or the desk of a hotel, the car rental agency or hotel clerk can swipe the user's credit card and enter a special code into the handset of the cellular telephone. This special code is placed in the phone call file set forth above and discussed in connection with FIG. 2B. The credit card driven portable cellular telephone then calls the particular telephone switch in the telecommunications network. At the switch, a computer program calls the credit card validation service and determines whether the user has sufficient credit available on his credit card. For example, a deposit of $600 may be required for this credit card driven portable cellular telephone. In such a situation, a $600 debit is logged against the user's credit card. The program at the telecommunications switch then sends a data signal back to the credit card driven portable cellular telephone. The hotel clerk or the car rental agency clerk then recognizes that $600 has been charged as a deposit for the credit card driven portable cellular telephone. Thereafter, the portable cellular telephone is then given to the user.

The user then carries the portable cellular telephone around as necessary. If the user wants to place the phone in use in an automobile, he or she simply withdraws the cigarette lighter adapter and plugs the cigarette lighter adapter into the cigarette lighter power plug in the automobile. Since the portable cellular telephone is a three watt phone, it is a high power phone. Additionally, an a/c power adapter may be included as part of the portable cellular telephone. This enables the user to charge the battery associated with the portable cellular telephone. Each call that the user makes is charged to his or her credit card. As discussed earlier, the credit card need only be validated once each day. At subsequent times, the user may use the cellular telephone without inputting his or her credit card. Bypass of this credit card insertion data may occur at the electronic interface between the handset and the cellular telephone transceiver or may occur at the telephone switch in the telecommunications network.

Since the portable cellular telephone is indeed portable, the user can simply unplug the phone and leave the phone in his or her hotel room or in the trunk of the automobile. When the user is done with the phone, he or she returns it to the hotel clerk or car rental agency. At that time, the clerk at the agency swipes the credit card through the portable cellular telephone and enters another special command into the handset. At the telecommunications switch, this command is recognized and the computer system issues a $600 credit to the user's credit card. In this manner, the wholesaler providing the credit card cellular telephone to the car rental agency or the hotel is assured that the user will not abscond with or steal the phone. Further, substantially all of the calls made by the user are billed to the user's credit card. Each day, the credit card transactions at the telecommunications switch are batch processed as is common with many credit card transactions.

In addition to distribution at a car rental agency or a hotel, it is possible that these credit card driven cellular telephones may be distributed in a vending machine. Certain vending machines manufactured by Sims Manufacturing can distribute these types of cellular telephones. Essentially, the user swipes his or her credit card and the $600 deposit is charged to the credit card prior to dispensing the portable cellular telephone in a bag.

In the current working embodiment, the credit card can be validated and the call to the destination phone call can be completed within 20–30 seconds. This is primarily because of the single data transmission to the telephone switch. That single data transmission includes generally the electronic identification number of the cellular telephone, the destination telephone number, and the credit card information data. It may be necessary to also transmit the merchant identification number. However, if the computer program at the telecommunications switch is operable, that computer program can match the cellular telephone electronic identification number to the merchant's ID number. It may be necessary to interject small acknowledgement signals during the uploading of the single data stream to the switch. These acknowledgement signals do not affect the upload process as a single data transfer.

Another important advantage of the present invention, when the phone is configured as a portable cellular phone, is the ability to place the phone in service. Since the phone is portable, the credit card driven cellular telephone can be placed in service by simply shipping the fully configured phone (see FIGS. 7–11) to the wholesaler or distributor. It should be noted that the wholesaler may actually buy the cellular telephone from the credit card cellular telephone company rather than lease the phone. The credit card cellular telephone manufacturer also provides the cellular telephone service through the call placement 1-800 telephone number. After the phone is delivered to a particular location, the wholesaler must establish a relationship with a cellular service provider. To activate the phone, the wholesaler inputs a special command into the cellular telephone. The phone then dials the call placement number and the computer at the telecommunications network node logs in the phone into the daily transaction record. The computer recognizes that the cellular phone has been newly activated and annotates the record accordingly.

To deactivate the cellular telephone, the credit card cellular telephone manufacturer simply annotates the computer at the telecommunications network node and all calls from that cell phone are blocked. In this manner, cellular phones can be activated and deactivated from remote locations.

The claims appended hereto are meant to cover modifications and changes within the scope and spirit of the present invention.

What is claimed is:

1. A method of operating a cellular telephone system by charging cellular telephone calls to users' credit cards comprising the steps of:

providing a plurality of portable cellular telephones having access to a telecommunications network, said network including a cellular telecommunications component with a particular telecommunications switch associated with a predetermined call placement telephone number, and a credit card verification component;

providing each cellular telephone with a handset and a transceiver unit coupled together via a communications bus, and a rechargeable battery coupled to said transceiver and said handset for supplying power thereto;

said communications bus carrying audio transmission signals, audio receive signals, data transmission signals and data receive signals between said handset and said transceiver unit;

providing an interface interposed between said handset and said transceiver, said interface having a credit card data input device;

said interface selectively monitoring, blocking, modifying and passing said audio transmission signals, audio receive signals, data transmission signals and data receive signals between said handset and said transceiver unit;

blocking all said audio transmission signals, audio receive signals, data transmission signals and data receive signals except emergency signals until said user inputs his or her credit card data into said card data input device;

gathering credit card data via said interface;

gathering a destination telephone number data via said handset;

inserting said predetermined call placement telephone number into at least one of said audio transmission signals and data transmission signals along with said credit card data and said destination telephone data;

sending, to said telecommunications network, said call placement telephone number, which directs the cellular telephone call to said particular telecommunications switch, said credit card data and said destination telephone data;

in the telecommunications network, verifying said credit card data via said credit card verification component, prior to completing a cellular telephone telecommunications call to said destination telephone;

completing said cellular telephone telecommunications call to said destination telephone; and recording and charging said user's credit card after termination of said cellular telephone telecommunications call to said destination telephone.

2. A method as claimed in claim 1 wherein said credit card data input device is a credit card reader and including the step of swiping said credit card through said reader as part of the step of gathering said credit card data.

3. A method as claimed in claim 2 wherein said handset is provided with a display and the method includes the step of displaying, to said user that said portable cellular telephone is locked out and unable to complete a call unless the user inputs his or her credit card data via said interface.

4. A method as claimed in claim 3 wherein the step of sending said call placement telephone number, said credit card data and said destination telephone data to said telecommunications network all occurs in a single, telecommunications data transfer.

5. A method of operating a cellular telephone system by charging cellular telephone calls to users' credit cards comprising the steps of:

providing a plurality of portable cellular telephones having access to a telecommunications network, said network including a cellular telecommunications component with a particular telecommunications switch associated with a predetermined call placement telephone number, and a credit card verification component;

providing each cellular telephone with a handset and a transceiver unit coupled together via a communications bus, and a rechargeable battery coupled to said transceiver for supplying power thereto;

said communications bus carrying audio transmission signals, audio receive signals, data transmission signals and data receive signals between said handset and said transceiver unit;

providing an interface interposed between said handset and said transceiver, said interface having a credit card data input device;

said interface selectively monitoring, blocking, modifying and passing said audio transmission signals, audio receive signals, data transmission signals and data receive signals between said handset and said transceiver unit;

blocking all said audio transmission signals, audio receive signals, data transmission signals and data receive signals except emergency signals until said user inputs his or her credit card data into said card data input device;

gathering credit card data via said interface;

gathering a destination telephone number data via said handset;

inserting said predetermined call placement telephone number into at least one of said audio transmission signals and data transmission signals along with said credit card data and said destination telephone data;

sending, to said telecommunications network, said call placement telephone number, which directs the cellular telephone call to said particular telecommunications switch, said credit card data and said destination telephone data, all in a single, telecommunications data transfer;

in the telecommunications network, verifying said credit card data via said credit card verification component, prior to completing a cellular telephone telecommunications call to said destination telephone;

completing said cellular telephone telecommunications call to said destination telephone; and recording and charging said user's credit card after termination of said cellular telephone telecommunications call to said destination telephone.

6. A cellular telephone calling system with a credit card call accounting and billing component, said cellular telephone calling system including a plurality of portable cellular telephones wherein users charge cellular telephone calls to credit cards, each said cellular telephone having access to a telecommunications network including a cellular telecommunications component and a credit card verification component comprising:

each portable cellular telephone having a handset and a transceiver unit coupled together via a communications bus, and a rechargeable battery coupled to said transceiver for supplying power thereto, said communications bus carrying audio transmission signals, audio receive signals, data transmission signals and data receive signals between said handset and said transceiver unit, said handset adapted to accept a destination telephone number from said user as part of initiating a telephonic communications link with a telephonic device corresponding to said destination telephone number;

a credit card interface unit coupled to said communications bus, said interface unit having means for selectively monitoring, blocking, modifying and passing said audio transmission signals, audio receive signals, data transmission signals and data receive signals between said handset and said transceiver unit;

a credit card data input device coupled to said interface unit;

as part of said interface unit:
    means for blocking all said audio transmission signals, audio receive signals, data transmission signals and data receive signals except emergency signals until said user inputs his or her credit card data into said card data input device;
    means for inserting a predetermined call placement telephone number into at least one of said audio transmission signals and data transmission signals along with said credit card data and said destination telephone data and for sending such data and signals to said telecommunications network via said transceiver and said communications bus;

as part of said telecommunications network:
    a network transceiver associated with said call placement telephone number, said network transceiver receiving said credit card data and said destination telephone data from said cellular telephone transceiver and having means for ascertaining the validity of said credit card data with said credit card verification component before completion of said telephonic communications link between said cellular telephone and said telephonic device corresponding to said destination telephone number.

7. A cellular telephone system as claimed in claim 6 wherein said credit card data input device is a credit card reader.

8. A cellular telephone system as claimed in claim 7 wherein said interface includes means for sending said call placement telephone number, said credit card data and said destination telephone data to said telecommunications network all in a single, telecommunications data transfer.

9. A cellular telephone system as claimed in claim 8 wherein said means for blocking includes means for passing emergency signals configured as destination telephone numbers such as "0" and "911" emergency telephone numbers input by said user, said means for passing including means for sending said emergency signals to said telecommunications network without said credit card data.

* * * * *